US007554944B2

(12) United States Patent
Garmonov et al.

(10) Patent No.: US 7,554,944 B2
(45) Date of Patent: Jun. 30, 2009

(54) SIGNAL TRANSMITTING METHOD AND DEVICE FOR CARRYING OUT SAID METHOD

(75) Inventors: Alexandr Vasilievich Garmonov, Voronezh (RU); Andrew Yurievich Savinkov, Voronezli (RU); Stanislav Anatolievich Filin, Voronezh (RU)

(73) Assignee: Avage Inc., Voronezh (RU)

( * ) Notice: Subject to any disclaimer, the term of this patent is extended or adjusted under 35 U.S.C. 154(b) by 236 days.

(21) Appl. No.: 10/591,719

(22) PCT Filed: Mar. 1, 2005

(86) PCT No.: PCT/RU2005/000087

§ 371 (c)(1),
(2), (4) Date: Sep. 5, 2006

(87) PCT Pub. No.: WO2005/086386

PCT Pub. Date: Sep. 15, 2005

(65) Prior Publication Data

US 2007/0189148 A1    Aug. 16, 2007

(30) Foreign Application Priority Data

Mar. 9, 2004    (RU) .............................. 2004107061
May 18, 2004   (RU) .............................. 2004114907

(51) Int. Cl.
*H04W 4/00* (2009.01)
(52) U.S. Cl. .................................... 370/329; 455/562.1
(58) Field of Classification Search .............. 455/562.1, 455/63.4; 370/329
See application file for complete search history.

(56) References Cited

U.S. PATENT DOCUMENTS 4,933,952 A    6/1990   Albrieux et al.

(Continued)

FOREIGN PATENT DOCUMENTS

RU    2 145 152    1/2000

(Continued)

OTHER PUBLICATIONS

English Translation of RU 2 192 094 dated Oct. 27, 2002.

(Continued)

*Primary Examiner*—Rafael Pérez-Gutiérrez
*Assistant Examiner*—Frank Donado
(74) *Attorney, Agent, or Firm*—Ladas & Parry LLP

(57) ABSTRACT

Method and apparatus of data transmission in a cellular communication system which can increase the efficiency of the information signal transmission in the downlink and, thus, maximize the information signal reception quality at the mobile station. The solution can also reduce the feedback channel (from mobile to base station) load. The apparatus operates along with the base station and provides M diversity groups of transmission channels, each group having K transmission channels. Each group of transmission channels is an independent adaptive antenna array with multiple antenna elements, each connected with the respective signal control components, which can ensure correction of the spectrum of the transmitted information signal copies, transmitting the information signal copies from each adaptive antenna array in each efficient transmission direction for transmit diversity, a combination of these two estimates and estimation of efficient transmission directions in the downlink using the received feedback signal.

25 Claims, 11 Drawing Sheets

U.S. PATENT DOCUMENTS

| | | | | |
|---|---|---|---|---|
| 5,539,832 | A * | 7/1996 | Weinstein et al. | 381/94.1 |
| 6,907,270 | B1 * | 6/2005 | Blanz | 455/562.1 |
| 6,952,459 | B2 * | 10/2005 | Voyer | 375/347 |
| 2003/0020651 | A1 * | 1/2003 | Crilly et al. | 342/378 |
| 2003/0036359 | A1 * | 2/2003 | Dent et al. | 455/63 |
| 2005/0117660 | A1 * | 6/2005 | Vialle et al. | 375/299 |

FOREIGN PATENT DOCUMENTS

| | | |
|---|---|---|
| RU | 2 192 094 | 10/2002 |
| RU | 2 208 911 | 7/2003 |
| WO | 92/00639 | 1/1992 |
| WO | 99/07090 | 2/1999 |
| WO | 99/63692 | 12/1999 |

OTHER PUBLICATIONS

Baskakov, S. I. "Radio Circuits and Signals" *Moscow "Vysshaya Skola"* (1988) Second Edition, pp. 211-212.

Kostie, Z. et al. "Estimation of the Parameters of a Multipath Channel Using Set-Theoretic Deconvolution" *IEEE Transactions on Communications* (1992) vol. 40, No. 6, pp. 1006-1011.

Gonorovsky, I. S. "Radio Circuits and Signals" *Moscow "Soviet Radio"* (1977) Third Edition, p. 177.

Ehrenberg, J. E. et al. "Signal-Processing Techniques for Resolving Individual Pulses in a Multipath Signal" *Journal Acoustical Society of America* (1978) vol. 63, No. 6, pp. 1861-1865.

Fujitsu "Enhance the Beamfoming Feature of the Mutliple Antenna Tx Diversity" *TSG-RAN* (2000) 1065, Working Group 1, No. 15, pp. 1-8.

Siemens "Advanced Closed Loop Tx Diversity Concept (eigenbeamformer)" *TSG-RAN* (2000) 0853, Working Group 1, No. 14, pp. 1-12.

Hewitt, A. et al. "An Autoregressive Approach to the Identification of Multipath Ray Parameters from Field Measurements" *IEEE Transactions on Communications* (1989) vol. 37, No. 11, pp. 1136-1143.

Liberti, J. C. et al. "Smart Antennas for Wireless Communications—IS-95 and Third Generation CDMA Applications" *Prentice Hall PTR* (1999) Chapter 3, pp. 81-116.

Dighe, P. A. et al. "Analysis of Transmit-Receive Diversity in Rayleigh Fading" *IEEE Transactions on Communications* (2003) vol. 51, No. 4, pp. 694-703.

Jakes, J.C. "Microwave Mobile Communications" *IEEE Communications Society* (1974) pp. 312-317.

Luo, J. et al. "Error Probability Performance for W-CDMA Systems with Multiple Transmit and Receive Antennas in Correlated Nakagami Fading Channels" *IEEE Transactions on Vehicular Technology* (2002) vol. 51, No. 6, pp. 1502-1516.

* cited by examiner

SIGNAL TRANSMITTING METHOD AND DEVICE FOR CARRYING OUT SAID METHOD

FIELD OF THE INVENTION

The present group of inventions relate generally to radio engineering, and more particularly to a method of data transmission (embodiments) and apparatus of data transmission (embodiments) to be used, for example, in cellular communications systems when transmitting an information signal over the downlink from base station to mobile station.

DESCRIPTION OF THE PRIOR ART

Increasing the communication systems capacity by means of efficient transmission and reception methods is currently a promising task. However, the use of advanced transmission and reception methods requires more complicated and expensive transmitters and receivers. In cellular communication systems, it appears reasonable to increase the complexity of a base station without influencing that of a mobile station. Hence, it is important to provide more efficient transmission methods in the downlink (from base station to mobile station) and reception methods in the uplink (from mobile station to base station).

The key factors limiting the downlink capacity are fading and interference. Fading is caused by non-line-of-site multipath signal propagation. Interference is due to the following reasons. During transmission from base station to mobile station only a part of energy arrives at the mobile station's antenna. The rest of transmitted energy acts as interference for other mobile stations.

Consequently, an efficient transmission method should combat fading and minimize the transmitted energy while maintaining the required signal level at the receiving antenna.

One of the transmission methods attaining these two goals is transmit diversity. Several transmit diversity methods are known.

When the orthogonal transmit diversity is used (see, for example, "Method of orthogonal transmission-reception of signal in cellular communication system with code division multiple access," patent RU2145152, published on Jan. 27, 2000, Int. Cl.$^7$ H 04 B 7/216, "Method and apparatus for signal transmission using transmit diversity," patent RU2208911, published on Jul. 20, 2003, Int. Cl.$^7$ H 04 B 7/0), every information symbol is transmitted from each antenna in such a way that the sequences of information symbols transmitted from different antennas are mutually orthogonal, and thus do not interfere with each other.

The signal transmitted from each antenna is subject to fading. Fadings of signals transmitted from different antennas are independent. Thus, orthogonal transmit diversity enables fading averaging, which leads to increased signal-to-interference-plus-noise ratio (SINR).

The maximum SINR gain that can be obtained using orthogonal transmit diversity is the SINR value equal to the SINR value in a stationary channel with one transmitting and one receiving antennas.

Orthogonal transmit diversity method does not require any feedback information.

In the selection transmit diversity method (see, for example, W. C. Jakes, Microwave mobile communications, IEEE press, 1974) a pilot signal is transmitted from each antenna. The receiver uses these pilot signals to estimate the propagation channel from each antenna. More particularly, the receiver estimates SINR in each pilot signal. The receiver selects the propagation channel and the corresponding antenna with the maximum SINR value. The receiver transmits the antenna's number to the transmitter. The transmitter uses only this antenna for transmission.

The selection transmit diversity method has a lower performance than that of the orthogonal transmit diversity method.

Coherent transmit diversity method described in patent RU2192094 "Method of signal transmission using coherent transmit diversity" published on Oct. 27, 2002 vol. 20 Int. Cl.$^7$ H 04 B 7/005 is more efficient than the two described methods.

According to the coherent transmit diversity method, each user's signal is transmitted from N diversity antennas.

The information signal copies propagate over N different propagation channels and are formed into a sum information signal at the receiving antenna.

To perform a near-optimal summation of these information signal copies, the estimates of N propagation channels are required at the transmitter. Hence, orthogonal or quasi-orthogonal pilot signals are transmitted from N diversity antennas. These pilot signals are used to estimate the propagation channels.

The propagation channels are estimated at the receiving side. The estimates are forwarded to the transmitter over a feedback channel.

When a copy of the information signal propagates over the propagation channel, it is subject to frequency-selective fading. Hence, frequency-selective pre-distortions are applied to the user's signal, transmitted from each of N diversity antennas. The pre-distortions are applied in such a way that the signal reception quality is maximized.

The information signal is received along with the additive noise that is the sum of the thermal noise and interference. This additive noise may be treated as white noise. Hence, the signal reception quality can be maximized through SINR maximization.

Spectral density of the received equivalent baseband signal can be written as $$X(f) = S(f) \sum_{n=1}^{N} G_n(f) T_n(f),$$

where

X(f) is the spectral density of the received information signal,
S(f) is the spectral density of the transmitted information signal,
$G_n(f)$ is the transfer function of the n-the propagation channel,
$T_n(f)$ is the transfer function of the n-the pre-distortion channel, $$\sum_{n=1}^{N} \int_{-\infty}^{\infty} |S(f) T_n(f)|^2 df = E_s,$$

that is, the total energy transmitted during one symbol is limited by $E_s$.

The SINR maximum is achieved when $$T_n(f) = \frac{1}{T_0 G_n^*(f)},$$

where * is the complex conjugation, and $T_0$ is a constant, which can be determined from the normalization condition ($E_s$).

This form of the transfer function of a pre-distortion channel may be interpreted as follows. Phases of transfer functions enable coherent summation of spectral densities of the information signal copies transmitted over different propagation channels. Amplitudes of transfer functions allow transmitting more energy over those parts of the signal spectra, where the transfer factor is higher. Consequently, less energy is transmitted over those parts of the signal spectra, where the transfer factor is lower.

In a multi-path propagation channel, only one path of each information signal copy is used in the coherent sum. Other paths are summed non-coherently.

When the sum information signal is received, the paths, other than those summed coherently, are usually not received. Hence, a matched filter, or a correlator, is used at the receiver. A RAKE receiver is not used, which makes the receiver implementation much simpler.

Let us neglect the impact of channel estimation errors, feedback channel errors and delay, and quantization errors. In this case, the coherent transmit diversity method is equivalent to the receive diversity method with a weighted summation of the received signals, where the weights are selected to maximize the received signal SINR.

Hence, we can use the results of the paper by J. Luo, J. R. Zeidler, and J. G. Proakis, "Error probability performance for W-CDMA systems with multiple transmit and receive antennas in correlated Nakagami fading channels," IEEE Trans. Veh. Technol., vol. 51, pp. 1502-1516, November 2002 to compare the specified transmit diversity methods.

FIG. 1 shows the bit error rate as a function of SINR in the propagation channel with Rayleigh fading and additive Gaussian interference. The AWGN curve corresponds to an additive white Gaussian noise channel with one transmission antenna and one reception antenna. This curve is a lower bound for the orthogonal transmit diversity method.

2Tx, 4Tx, and 8Tx CTD curves correspond to the coherent transmit diversity method in the fading channel with 2, 4, and 8 transmission antennas.

To sum up, a coherent transmit diversity method is the most efficient method of transmission using diversity antennas. The efficiency of the coherent transmit diversity method increases with the increase in the number of transmitting antennas. Moreover, transmit diversity requires that fading in different copies of information signal be independent. To do this, transmission antennas should be spatially separated by a distance of 10 wavelengths or more.

Using an adaptive antenna system (see, for example, J. C. Liberti and T. S. Rappaport, Smart antennas for wireless communications: IS-95 and third generation CDMA applications, Prentice Hall, New Jersey, 1999) is another efficient method of reducing interference.

The adaptive antenna system comprises several antenna elements arranged close to each other. During transmission, information signal copies are multiplied by weighting coefficients and transmitted from antenna elements.

FIG. 2 shows a linear equidistant antenna array placed along the x axis with the zero antenna element placed at the point of origin. The distance between the adjacent elements is $\Delta x$. This distance should be less than a wavelength.

For simplicity we assume that the receiving antenna height is approximately equal to that of the transmitting antenna. Under this assumption we can analyze the antenna pattern in the (x, y) plane only. In other words, we analyze the dependence of the antenna pattern on angle $\phi$. Signal $s_{Tx}(t)$ transmitted in the direction $\phi$ is equal to $$s_{Tx}(t) = s(t) \sum_{m=0}^{M-1} w_m \exp(-j\beta m \Delta x \cos \varphi) = s(t) f(\varphi),$$

where
$\beta = 2\pi/\lambda$, where $\lambda$ is the wavelength,
$f(\phi)$ is the horizontal plane antenna pattern.

To obtain the antenna pattern maximum in the direction $\phi_0$, we need to set the weighting coefficients $w_m$ equal to $w_m = \exp(j\beta m \Delta x \cos \phi_0)$.

Consequently, the antenna pattern will be $$f(\varphi_0, \varphi) = \sum_{m=0}^{M-1} \exp(-j\beta m \Delta x (\cos \varphi - \cos \varphi_0)).$$

Commonly, each element of the antenna array has a predetermined antenna pattern. If all of the antenna elements have the same and equally directed antenna patterns $f_a(\phi)$, the resulting antenna pattern F ($\phi_0$, $\phi$) will be $F(\phi_0, \phi) = f(\phi_0, \phi) f_a(\phi)$.

FIG. 3 shows two antenna patterns of the antenna array with 8 antenna elements placed at $\lambda/2$ from each other with the following antenna pattern $$f_a(\varphi) = \begin{cases} 1, & \left|\varphi - \frac{\pi}{2}\right| \leq \frac{\pi}{3}; \\ 0, & \text{for other } \varphi. \end{cases}$$

The maxima of these two antenna patterns corresponds to $$\varphi_0 = \frac{\pi}{3} \text{ and } \varphi_0 = \frac{2\pi}{3}.$$

When an antenna array is used, the information signal's energy is transmitted in the angle spread $\Delta\phi$, the center of which is directed at $\phi_0$. Hence, to obtain the same value of the transmitted signal in the direction $\phi_0$, less energy is required compared to the transmission from one antenna element with the antenna pattern $f_a(\phi)$. Consequently, the interference is significantly reduced.

The value of interference reduction increases linearly with the increase in the number of antenna elements.

Efficient signal transmission methods have gradually developed into a joint usage of both methods, that is, transmit diversity method and adaptive antenna system.

A method, described in Siemens, Advanced closed loop Tx diversity concept (eigenbeamformer), 3GPP TSG RAN WG 1 document, TSGR1#14(00) 0853, Jul. 4-7, 2000, Oulu, Finland, combines an adaptive antenna system and either a selective transmit diversity or an orthogonal transmit diversity.

The idea behind this method is that the propagation channel between the base station and the mobile station can include several scattering areas (FIG. 4). The transmitted signal propagates over all these areas before arriving at the mobile station.

The method proposes to use the adaptive antenna array with M antenna elements at the base station.

A pilot signal is transmitted from each antenna element. All M transmitted pilot signals are mutually orthogonal or quasi-orthogonal.

A copy of the information signal multiplied by a weighting coefficient is transmitted from each antenna element.

FIG. 5 illustrates this method, which includes the following operations.

M copies of the information signal s(t) are generated at the base station. The m-th copy of the information signal, where m takes on the values from 1 to M, is multiplied by the weighting coefficient $w_m$. The corresponding pilot signal $p_m(t)$ is added to the result.

The obtained sum is transmitted from the corresponding m-th antenna element.

M pilot signals and the information signal are received at the mobile station.

The pilot signals are subject to a multi-path propagation, that is, several paths are available at the mobile station. Let N be the number of paths. M sets of coefficients of the propagation channel impulse response $h_{1n}$, $h_{2n}$, ..., $h_{Mn}$, where n=1, ..., N, are estimated using M transmitted pilot signals.

The impulse response coefficient $h_{mn}$ corresponds to the propagation channel between the m-th antenna element and the mobile station antenna and to the n-th path.

A spatial correlation matrix is generated for each path $$\hat{R}_n = \vec{h}_n \vec{h}_n^H,$$

where $$\vec{h}_n = [h_{1n}, h_{2n}, \ldots, h_{Mn}]^T,$$

$\vec{x}^H$ is the Hermit conjugation of the vector $\vec{x}$.

Spatial correlation matrix is generated for all paths $$\hat{R} = \sum_{n=1}^{N} \hat{R}_n.$$

Matrices $\hat{R}_n$ and $\hat{R}$ are generated periodically. Let us denote matrices $\hat{R}_n$ and $\hat{R}$ generated at step i, where i=1,2, ..., by $\hat{R}_n(i)$ and $\hat{R}(i)$.

An average spatial correlation matrix is generated as $$\langle \hat{R}(1) \rangle = \hat{R}(1);$$

$$\langle \hat{R}(i) \rangle = \rho \langle \hat{R}(i-1) \rangle + (1-\rho)\hat{R}(i), i>1.$$

Here $|\rho| \leq 1$ is the averaging factor.

The average spatial correlation matrix is decomposed into eigen values and eigen vectors $$\langle \hat{R}(i) \rangle \hat{V}(i) = \hat{V}(i)\hat{\Theta}(i),$$

where

The dimensions of matrix $\langle \hat{R}(i) \rangle$ are [M×M].

Matrix $\vec{V}_m(i)$ is [M×M]. It comprises the eigen vectors of matrix $\langle \hat{R}(i) \rangle$, where $\vec{V}_m(i)$ is the eigen vector of matrix $\langle \hat{R}(i) \rangle$, corresponding to the m-th eigen value of matrix $\langle \hat{R}(i) \rangle$.

Matrix $\hat{\Theta}(i) = \text{diag}[\theta_1(i), \theta_2(i), \ldots, \theta_M(i)]$ is [M×M]. It comprises the eigen values of matrix $\langle \hat{R}(i) \rangle$, where $\theta_m(i)$ is the m-th eigen value of matrix $\langle \hat{R}(i) \rangle$. Eigen values $\theta_m(i)$ in matrix $\hat{\Theta}(i)$ are arranged along the main diagonal. Other elements of matrix $\hat{\Theta}(i)$ are equal to zero.

Eigen values and eigen vectors of an average spatial correlation matrix have the following properties.

The eigen vectors of the average spatial correlation matrix determine the efficient transmission directions from the base station to the mobile station. In other words, the energy transmitted in these directions will reach the mobile station.

The eigen values of the spatial correlation matrix determine the average value of the energy received at the mobile station when transmission is performed in the direction of a corresponding eigen vector.

The matrix of eigen vectors $\hat{V}(i)$ is transmitted from the base station to the mobile station. This operation is performed at each step or less frequently, because efficient transmission directions change slowly compared to, for example, fading frequency.

Two embodiments of the method are proposed.

According to the first embodiment, at each step M the power values are estimated at the mobile station. These power values are the ones received at the mobile station given that transmission is performed in M corresponding directions, determined by eigen vectors $\vec{V}_m(i)$. These power values are determined as $$P_m = \vec{V}_m^H(i)\hat{R}(i)\vec{V}_m(i).$$

Here, index m corresponds to one of the efficient transmission directions determined previously.

The number $m_{max}(i)$ of the efficient transmission direction, which corresponds to the maximum receiving power value, is selected. This number is transmitted from the mobile station to the base station. At the base station, transmission is performed in the $m_{max}(i)$-th efficient transmission direction, that is, $$[w_1(i), w_2(i), \ldots, w_M(i)]^T = \vec{V}_{m_{max}(i)}(i).$$

According to the second embodiment, two or more efficient transmission directions, which correspond to two or more maximum receiving power values, are selected.

At the base station, the information signal is transmitted in all selected efficient transmission directions. Transmission is organized in such a way that all transmitted information symbols are mutually orthogonal, that is, they do not interfere with each other.

On the whole, the second embodiment of the specified method jointly uses the methods of adaptive antenna system and the orthogonal transmit diversity.

The outlined method has two drawbacks. First, it does not use the efficient transmit diversity method, that is, coherent transmit diversity. Moreover, it uses one adaptive antenna array, which reduces the degree of diversity, compared to when several adaptive antenna arrays are used.

A method, described in Fujitsu, Enhance the Beamforming Feature of the Multiple Antenna Tx Diversity, 3GPP TSG RAN WG 1 document, TSGR1#15(00)-1065, Aug. 22-25, 2000, Berlin, Germany, jointly uses the adaptive antenna system method and the coherent transmit diversity method. This method is the closest one to our method.

Let us consider a cellular communication system comprising at least one base station and at least one mobile station.

The base station transmits an information signal and pilot signals to the mobile station. The mobile station uses these pilot signals to estimate the propagation channel between the base station and the mobile station. The base station may also transmit other signals, for example, information signals to other mobile stations or control signals.

The mobile station transmits a feedback signal to the base station. The base station uses this feedback signal for transmitting the information signal to the mobile station. Also, the mobile station may transmit other signals, for example, an information signal.

The base station has M adaptive antenna arrays, where $M \geq 1$. Each antenna array has K antenna elements, where $K \geq 1$.

Antenna elements of one adaptive antenna array are placed close to each other (at less than a carrier frequency wavelength). Adaptive antenna arrays are placed far from each other (at more than 10 carrier frequency wavelengths).

Each antenna element forms a transmission channel. There are a total of M·K transmission channels.

Consequently, each adaptive antenna array has a group of transmission channels.

The base station transmits a pilot signal from each antenna element of each adaptive antenna array. All these pilot signals are mutually orthogonal or quasi-orthogonal.

Pilot signals are considered orthogonal or quasi-orthogonal when the maximum value of a correlation function between any two pilot signals is much less than the maximum value of an auto-correlation function of each pilot signal.

Let us denote the pilot signal transmitted from the antenna element k of the adaptive antenna array m by $P_{m,k}$, where $m=\overline{1,M}$ and $k=\overline{1,K}$.

The impulse responses of the propagation channels between each antenna element of each adaptive antenna array and the mobile station's antenna are estimated at the mobile station using the received pilot signals.

Let $H_{m,k}$ be the estimate of the impulse response of the propagation channel between the antenna element k of the adaptive antenna array m and the mobile station's antenna.

M weighting coefficients $WDA_1, WDA_2, \ldots, WDA_M$ are formed such that the following expression $$PD = [(WDA_1)^* \ (WDA_2)^* \ \ldots \ (WDA_M)^*] \cdot \begin{bmatrix} (H_{1,1})^* \\ (H_{2,1})^* \\ \vdots \\ (H_{M,1})^* \end{bmatrix} \cdot$$

$$[H_{1,1} \ H_{2,1} \ \ldots \ H_{M,1}] \cdot \begin{bmatrix} WDA_1 \\ WDA_2 \\ \vdots \\ WDA_M \end{bmatrix},$$

is maximized, where x* is a complex conjugation of the variable x. Maximization of this expression leads to the following. When a copy of the information signal is transmitted from the adaptive antenna array m with the weighting coefficient $WDA_m$, all copies of the information signal are summed coherently at the mobile station's antenna given that fading is flat in each of the propagation channels considered. Flat fading means that the propagation channel has no multipath.

K weighting coefficients $WBA_{m,1}, WBA_{m,2}, \ldots, WBA_{m,K}$ are formed for each adaptive antenna array such that the following expression $$PB = [(WBA_{m,1})^* \ (WBA_{m,2})^* \ \ldots \ (WBA_{m,K})^*] \cdot \begin{bmatrix} (H_{m,1})^* \\ (H_{m,2})^* \\ \vdots \\ (H_{m,K})^* \end{bmatrix} \cdot$$

$$[H_{m,1} \ H_{m,2} \ \ldots \ H_{m,K}] \cdot \begin{bmatrix} WBA_{m,1} \\ WBA_{m,2} \\ \vdots \\ WBA_{m,K} \end{bmatrix}$$

is maximized. In other words, a vector of weighting coefficients $WBA_{m,1}, WBA_{m,2}, \ldots, WBA_{m,K}$ is formed for each adaptive antenna array. This vector corresponds to the efficient transmission direction that agrees with the maximum value of the power received at the mobile station.

Note that PD and PB can be maximized, for example, as described in [P. A. Dighe, R. K. Mallik, and S. S. Jamuar, "Analysis of transmit-receive diversity in Rayleigh fading," IEEE Trans. Commun., vol. 51, pp. 694-703, April 2003].

Vector $[WDA_1, WDA_2, \ldots, WDA_M]^T$ can be found as an eigen vector of matrix $[H_{m,1}, H_{m,2}, \ldots, H_{m,K}]^H [H_{m,1}, H_{m,2}, \ldots, H_{m,K}]$ corresponding to the maximum eigen value of this matrix, where $\vec{x}^H$ is a Hermit conjugation of the vector $\vec{x}$.

Vector $[WBA_{m,1}, WBA_{m,2}, \ldots, WBA_{m,K}]^T$ can be found as an eigen vector of matrix $[H_{m,1}, H_{m,2}, \ldots, H_{m,K}]^H [H_{m,1}, H_{m,2}, \ldots, H_{m,K}]$ corresponding to the maximum eigen value of this matrix.

As the relative values of the weighting coefficients are of interest, the amount of the information transmitted in the feedback signal can be reduced.

The $[1 \times (M-1)]$ vector of weighting coefficients of transmit diversity $$\left[\frac{WDA_2}{WDA_1}, \frac{WDA_3}{WDA_1}, \ldots, \frac{WDA_M}{WDA_1}\right]^T$$

is formed from $[1 \times M]$ vector of weighting coefficients of transmit diversity $[WDA_1, WDA_2, \ldots, WDA_M]^T$. This means that the first weighting coefficient $$\frac{WDA_1}{WDA_1}$$

is equal to 1. Hence, there is no need to transmit it.

Let us denote $$WD_1 \equiv 1, \ WD_2 = \frac{WDA_2}{WDA_1}, \ldots, \ WD_M = \frac{WDA_M}{WDA_1}.$$

The vector of weighting coefficients of transmission direction $$\left[\frac{WBA_{m,2}}{WBA_{m,1}}, \frac{WBA_{m,3}}{WBA_{m,1}}, \ldots, \frac{WBA_{m,K}}{WBA_{m,1}}\right]^T$$

of dimension [1×(K−1)] is formed from each [1×K] vector of weighting coefficients of transmission direction $[WBA_{m,1}, WBA_{m,2}, \ldots, WBA_{m,K}]^T$. This means that weighting coefficients $$\frac{WBA_{m,1}}{WBA_{m,1}}$$

are equal to 1 and there is no need to transmit them.

Let us also denote $$WB_{m,1} \equiv 1, \; WB_{m,2} = \frac{WBA_{m,2}}{WBA_{m,1}}, \ldots, \; WB_{m,K} = \frac{WBA_{m,K}}{WBA_{m,1}}.$$

The formed vector of weighting coefficients of transmit diversity and M formed vectors of weighting coefficients of transmission direction are transmitted from the mobile station to the base station.

Normally, the efficient transmission directions change less rapidly than fading. Hence, M formed vectors of weighting coefficients of transmission direction can be transmitted less frequently than the formed vector of weighting coefficients of transmit diversity.

M·K information signal copies are formed at the base station. Let as denote them by $S_{m,k}$.

The information signal copy $S_{m,k}$ is transmitted from the antenna element k of the adaptive antenna array m.

Before transmission, the information signal copy $S_{m,k}$ is multiplied by the corresponding weighting coefficient of transmit diversity $WD_m$ and by the corresponding weighting coefficient of transmission direction $WB_{m,k}$.

FIG. 6 illustrates the operations of multiplying the information signal copies $S_{m,k}$ by the weighting coefficients and adding the pilot signals.

For simplicity, FIG. 6 does not contain radiofrequency parts, which convert a digital signal into an analog signal.

M·K information signal copies $S_{m,k}$ are formed from the information signal S (FIG. 6).

An information signal copy arrives at the multiplier, where it is multiplied by the weighting coefficient of transmit diversity $WD_m$; after that it is fed to another multiplier, where it is multiplied by the weighting coefficient of transmission direction $WB_{m,k}$; then it arrives at the summator, where the pilot signal $P_{m,k}$ is added to this information signal copy; next it is transmitted from the antenna element k of the adaptive antenna array m. The previously known method, according to its description, comprises the following operations:

M diverse groups of transmission channels each having K transmission channels, where M≧1, K≧1, are formed at the base station;

A pilot signal is transmitted over each of M·K transmission channels of diverse groups of transmission channels from base station to mobile station;

Impulse responses of M·K transmission channels of diverse groups of transmission channels are estimated at mobile station using the transmitted pilot signals;

M−1 weighting coefficients of transmit diversity are formed at mobile station using the estimated impulse responses of transmission channels;

K−1 weighting coefficients of transmission direction are formed at mobile station for each of M diverse groups of transmission channels using the estimated impulse responses of transmission channels;

A feedback signal containing M−1 weighting coefficients of transmit diversity and M·(K−1) weighting coefficients of transmission direction is transmitted from mobile station to base station;

M·K information signal copies are formed at base station;

Each information signal copy is transmitted from a corresponding transmission channel of a respective diverse group of transmission channels;

Before transmission, each information signal copy is multiplied by a corresponding weighting coefficient of transmit diversity and a corresponding weighting coefficient of transmission direction.

Here, M−1 weighting coefficients of transmit diversity $WD_2, WD_3, \ldots, WD_M$ are formed in two steps.

During the first step, M weighting coefficients $WDA_1, WDA_2, \ldots, WDA_M$ are formed such that the expression $$PD = [(WDA_1)^* \; (WDA_2)^* \; \ldots \; (WDA_M)^*] \cdot \begin{bmatrix}(H_{1,1})^* \\ (H_{2,1})^* \\ \vdots \\ (H_{M,1})^*\end{bmatrix} \cdot$$

$$[H_{1,1} \; H_{2,1} \; \ldots \; H_{M,1}] \cdot \begin{bmatrix}WDA_1 \\ WDA_2 \\ \vdots \\ WDA_M\end{bmatrix},$$

is maximized, where $H_{m,1}$ is the estimate of an impulse response of the first transmission channel of diverse group of transmission channels m, where m=$\overline{1,M}$, x* is a complex conjugation of the variable x.

During the second step, M−1 weighting coefficients of transmit diversity $WD_2, WD_3, \ldots, WD_M$ are formed as $$WD_m = \frac{WDA_m}{WDA_1},$$

where m=$\overline{2,M}$.

K−1 weighting coefficients of transmission direction $WB_{m,2}, WB_{m,3}, \ldots, WB_{m,K}$ for a diverse group of transmission channels m are formed in two steps, where m=$\overline{1,M}$.

During the first step, K weighting coefficients $WBA_{m,1}, WBA_{m,2}, \ldots, WBA_{mK}$ are formed for diverse groups of transmission channels m such that the expression $$PB = [(WBA_{m,1})^* \; (WBA_{m,2})^* \; \ldots \; (WBA_{m,K})^*] \cdot \begin{bmatrix}(H_{m,1})^* \\ (H_{m,2})^* \\ \vdots \\ (H_{m,K})^*\end{bmatrix}.$$

-continued $$[H_{m,1} \quad H_{m,2} \quad \ldots \quad H_{m,K}] \cdot \begin{bmatrix} WBA_{m,1} \\ WBA_{m,2} \\ \vdots \\ WBA_{m,K} \end{bmatrix},$$

is maximized, where $H_{m,k}$ is the estimate of an impulse response of the transmission channel k of the diverse group of transmission channels m, where $m=\overline{1,M}$, $k=\overline{1,K}$, x* is a complex conjugate of the variable x.

During the second step, K−1 weighting coefficients of transmission direction $WB_{m,2}, WB_{m,3}, \ldots, WB_{m,K}$ are formed as $$WB_{m,k} = \frac{WBA_{m,k}}{WBA_{m,1}},$$

where $m=\overline{1,M}$, $k=\overline{2,K}$.

An apparatus used for implementing the known method is shown in FIG. 7. It comprises multipliers 1-1-1-M, blocks of directional transmission 2-1-2-M, summation blocks 3-1-1-3-M-K, analog transmitters 4-1-1-4-M-K, antenna elements 5-1-1-5-M-K; where the first inputs of multipliers 1-1-1-M are the information signal inputs, their second inputs are inputs of the corresponding weighting coefficients of transmit diversity, outputs of multipliers 1-1-1-M are connected to the first inputs of blocks of directional transmission 2-1-2-M, K second inputs of blocks of directional transmission 2-1-2-M are inputs of the corresponding weighting coefficients of transmission direction, K outputs of each of directional transmission blocks 2-1-2-M are connected to the second inputs of the corresponding summation blocks 3-1-1, ..., 3-1-K-3-M-1, ..., 3-M-K, the first inputs of which are inputs of the corresponding pilot signals, outputs of summation blocks 3-1-1-3-M-K are connected to inputs of the corresponding analog transmitters 4-1-1-4-M-K, outputs of which are connected to inputs of the corresponding antenna elements 5-1-1-5-M-K, outputs of which are outputs of the apparatus of data transmission.

The block of directional transmission 2-m, where m takes on values from 1 to M, is shown in FIG. 8. According to FIG. 8, block of directional transmission 2-m comprises multipliers 6-m-1-6-m-K; where the first inputs of multipliers 6-m-1-6-m-K are inputs of the information signal, their second inputs are inputs of the corresponding weighting coefficients of transmission direction, and their outputs are outputs of block of directional transmission 2-m.

The previously known method and apparatus are implemented as follows (FIGS. 7 and 8).

M diverse groups of transmission channels are formed at base station, where each diverse group of transmission channels comprises K transmission channels, where $M \geq 1$, $K \geq 1$.

Each of M·K transmission channels is formed by the corresponding analog transmitter 4-m-k and the respective antenna element 5-m-k, where m takes on values from 1 to M, k takes on values from 1 to K.

Each of M diverse groups of transmission channels is formed by the corresponding block of directional transmission 2-m, the corresponding analog transmitters 4-m-1-4-m-K, and the corresponding antenna elements 5-m-1-5-m-K.

A pilot signal is transmitted from base station to mobile station from each of M·K transmission channels of diverse groups.

Each of M·K pilot signals is forwarded to the first input of the corresponding summation block 3-m-k, then it is forwarded from its output to an input of the corresponding analog transmitter 4-m-k, then it is forwarded from its output to an input of the corresponding antenna element 5-m-k, the output of which is the output of the apparatus of data transmission.

Impulse responses of M·K transmission channels of diverse groups are estimated at the mobile station using the transmitted pilot signals.

M−1 weighting coefficients of transmit diversity are formed at the mobile station using estimated impulse responses of transmission channels.

For each of M diverse groups of transmission channels K−1 weighting coefficients of transmission direction are formed at the mobile station using the estimated impulse responses of transmission channels.

The feedback signal, containing M-1 weighting coefficients of transmit diversity and M·(K−1) weighting coefficients of transmission direction, is transmitted from the mobile station to the base station.

M·K copies of information signal are formed at base station.

First, M information signal copies are formed and forwarded to the first inputs of multipliers 1-1-1-M, then they are forwarded from their outputs to the first inputs of blocks of directional transmission 2-1-2-M.

Then, K information signal copies are formed in each of M blocks of directional transmission 2-m using the copy of the information signal arrived to its input. Hence, the total of M·K information signal copies are formed.

Each information signal copy is transmitted over its transmission channel of its diverse group of transmission channels. Before transmission, each information signal copy is multiplied by a corresponding weighting coefficient of transmission direction.

M information signal copies arrive at the first inputs of multipliers 1-1-1-M, and the corresponding weighting coefficients of transmit diversity are forwarded to their second inputs.

Information signal copies are multiplied by the corresponding weighting coefficients of transmit diversity in multipliers 1-1-1-M, and then they are forwarded from outputs of multipliers 1-1-1-M to the first inputs of the corresponding blocks of directional transmission 2-1-2-M.

The corresponding weighting coefficients of transmission direction are forwarded to K second inputs of blocks of directional transmission 2-1-2-M.

K information signal copies are formed in each of M blocks of directional transmission 2-m using the copy of the information signal arrived to its first input, and then they are forwarded to the first inputs of the corresponding multipliers 6-m-1-6-m-K.

The corresponding weighting coefficients of transmission direction are forwarded to the respective second inputs of multipliers 6-m-1-6-m-K.

The information signal copies are multiplied by the corresponding weighting coefficients of transmission direction in multipliers 6-m-1-6-m-K, and then they are forwarded from K outputs of blocks of directional transmission 2-1-2-M to the second inputs of corresponding blocks of summation 3-1-1, ..., 3-1-K-3-M-1, ..., 3-M-K.

The corresponding information signal copy and the respective pilot signal are summed in summation blocks 3-1-1-3-M-K.

Sums of the information signal copy and the pilot signal are forwarded from outputs of summation blocks 3-1-1-3-M-K to inputs of the corresponding analog transmitters 4-1-1-4-M-K, then they are forwarded from their outputs to inputs of the corresponding antenna elements 5-1-1-5-M-K, outputs of which are outputs of the apparatus of data transmission.

When the information signal copies transmitted from the adaptive antenna arrays are subject to frequency-selective fading, the described method and apparatus do not allow coherent summation of the information signal copies at the mobile station. Consequently, the known method and apparatus do not provide the specified advantages of coherent transmit diversity.

The previously known method and apparatus enable transmission of only one copy of the information signal in only one direction from each adaptive antenna array. However, it is well known that the efficiency of fading averaging increases as the number of diversity channels increases. Hence, these method and apparatus do not use all available transmission directions and decrease the efficiency of fading averaging.

The above method and apparatus use the pilot signals transmitted from each antenna element for estimation of impulse responses of transmission channels from each antenna element to mobile station antenna to generate both weighting coefficients of transmit diversity and weighting coefficients of transmission direction. However, the required rate of updating the weighting coefficients of transmission direction is much lower than that of updating the weighting coefficients of transmit diversity. Hence, weighting coefficients of transmission direction are much more accurate than weighting coefficients of transmit diversity. The weighting coefficients of transmit diversity might not be sufficiently accurate. As a result, this would decrease the efficiency of the method and apparatus for data transmission.

The described method and apparatus require generation of K−1 weighting coefficients of transmission direction for each of M adaptive antenna arrays at mobile station followed by transmission of the generated weighting coefficients of transmission direction to base station over a feedback channel. Usually, two-way transmission of information signals between base station and mobile station is carried out. Hence, efficient transmission directions in the downlink (from base station to mobile station) can be estimated using the uplink signal (from mobile station to base station). Consequently, weighting coefficients of transmission direction can be generated at base station, thereby decreasing the feedback channel load.

SUMMARY OF THE INVENTION

The present invention provides a method (embodiments) and apparatus (embodiments) for data transmission used to increase the efficiency of information signal transmission in downlink and, hence, maximize the information signal reception quality at the mobile station as well as to reduce the feedback channel load.

The object of the present invention is attained by four embodiments of the data transmission method, made in accordance with a single inventive idea, aimed at achieving the same technical goal and providing the same technical effect.

A data transmission apparatus is provided to implement each embodiment of the data transmission method, that is, the total of three embodiments of the apparatus and four embodiments of the method are claimed.

The aim of the invention is achieved by the data transmission method according to the first embodiment, such that M diverse groups of transmission channels each having K transmission channels, where $M \geq 1$, $K \geq 1$, are formed at the base station;

pilot signals are transmitted from the base station to the mobile station from all M·K transmission channels of diverse groups;

impulse responses of M·K transmission channels of diverse groups are estimated at the mobile station using the transmitted pilot signals;

according to the invention $L_m$ sets of weighting coefficients of transmission direction each having K−1 weighting coefficients of transmission direction are formed at the mobile station using the estimated impulse responses of M·K transmission channels of diverse groups, where $1 \leq L_m \leq K$ and m=1,2, . . . , M;

for each of M diverse groups of transmission channels for each of $L_m$ sets of weighting coefficients of transmission direction a transfer function of a channel of directional transmission corresponding to this set is estimated at the mobile station;

a feedback signal containing $L_m$ weighting coefficients of transmission direction formed for each of M diverse groups of transmission channels as well as the estimated transfer function for each of $L_m$ weighting coefficients of transmission direction formed for each of M diverse groups of transmission channels is transmitted from the mobile station to the base station;

$L_m$ channels of directional transmission are formed at the base station for each of M diverse groups of transmission channels using the transmitted sets of weighting coefficients of transmission direction;

channels of signal spectrum correction are formed at the base station for each of M diverse groups of transmission channels for each of $L_m$ channels of directional transmission and their transfer functions are corrected according to the transmitted estimated transfer functions of channels of directional transmission in such a way that the reception quality of information signal at mobile station is maximized;

information signal copies are formed at the base station for all $L_m$ channels of directional transmission for all M diverse groups of transmission channels and all formed copies of information signal are simultaneously transmitted over the corresponding channels of directional transmission after applying them to the corresponding channels of signal spectrum correction.

All transmitted pilot signals and information signal are mutually orthogonal or quasi-orthogonal.

The goal of the invention is attained by the data transmission method according to the second embodiment, such that M diverse groups of transmission channels each having K transmission channels are formed at the base station, where $M \geq 1$, $K \geq 1$, pilot signals are transmitted from the base station to the mobile station from all M·K transmission channels of diverse groups;

impulse responses of M·K transmission channels of diverse groups are estimated at the mobile station using the transmitted pilot signals;

according to the invention $L_m$ sets of weighting coefficients of transmission direction each having K−1 weighting coefficients of transmission direction are formed at the mobile station for each of M diverse groups of transmission channels using the estimated impulse responses of M·K transmission channels of diverse groups, where $1 \leq L_m \leq K$ and $m=1,2,\ldots,M$;

a feedback signal containing $L_m$ formed sets of weighting coefficients of transmission direction for each of M diverse groups of transmission channels is transmitted from the mobile station to the base station;

$L_m$ channels of directional transmission are formed at the base station at each of M diverse groups of transmission channels using the transmitted sets of weighting coefficients of transmission direction;

pilot signals for transmit diversity are transmitted from base to mobile station from each of M diverse groups of transmission channels over each of $L_m$ channels of directional transmission;

transfer functions of each of $L_m$ channels of directional transmission are estimated at mobile station for each of M diverse groups of transmission channels using the transmitted pilot signals for transmit diversity;

the feedback signal containing $L_m$ estimated transfer functions of channels of direction transmission for each of M diverse groups of transmission channels is transmitted from the mobile station to the base station;

channels of signal spectrum correction are formed at the base station for each of M diverse groups of transmission channels for each of $L_m$ channels of directional transmission and their transfer functions are corrected according to the transmitted estimated transfer functions of channels of directional transmission in such a way that the reception quality of the information signal at the mobile station is maximized;

information signal copies are formed at the base station for all $L_m$ channels of directional transmission for all M diverse groups of transmission channels and all formed information signal copies are simultaneously transmitted over the corresponding channels of directional transmission after applying them to the corresponding channels of signal spectrum correction.

The aim of the invention is achieved by the data transmission method according to the third embodiment, such that M diverse groups of transmission channels each having K transmission channels, where $M \geq 1$, $K \geq 1$, are formed at base station;

pilot signals are transmitted from the base station to the mobile station from all M·K transmission channels of diverse groups;

impulse responses of M·K transmission channels of diverse groups are estimated at the mobile station using the transmitted pilot signals;

according to the invention $L_m$ sets of weighting coefficients of transmission direction each having K-1 weighting coefficients of transmission direction are formed at the mobile station for each of M diverse groups of transmission channels using the estimated impulse responses of M·K transmission channels of diverse groups, where $1 \leq L_m \leq K$ and $m=1,2,\ldots,M$, transfer functions of channels of directional transmission corresponding to each of $L_m$ sets of weighting coefficients of transmission direction of all M diverse groups of transmission channels are estimated at the mobile station, a feedback signal containing $L_m$ formed sets of weighting coefficients of transmission direction for each of M diverse groups of transmission channels is transmitted from the mobile station to the base station, $L_m$ channels of directional transmission are formed at the base station at each of M diverse groups of transmission channels using the transmitted sets of weighting coefficients of transmission direction, pilot signals for transmit diversity are transmitted from the base station to the mobile station from each of M diverse groups of transmission channels over each of $L_m$ channels of directional transmission, transfer functions of $L_m$ channels of directional transmission for each of M diverse groups of transmission channels are estimated at the mobile station using the transmitted pilot signals for transmit diversity, for each of M diverse groups of transmission channels an estimate of the transfer function of each of $L_m$ channels of directional transmission, obtained using K pilot signals transmitted from this diverse group of transmission channels, is combined with an estimate of its transfer function, obtained using the pilot signal for transmit diversity transmitted from this diverse group of transmission channels, a feedback signal containing $L_m$ estimated transfer functions of channels of directional transmission for each of M diverse groups of transmission channels is transmitted from the mobile station to the base station, channels of signal spectrum correction are formed at the base station for each of M diverse groups of transmission channels for each of $L_m$ channels of directional transmission and their transfer functions are corrected according to the transmitted estimated transfer functions of channels of directional transmission in such a way that the reception quality of the information signal at the mobile station is maximized, information signal copies are formed at the base station for all $L_m$ channels of directional transmission for all M diverse groups of transmission channels and all formed copies of the information signal are simultaneously transmitted over the corresponding channels of directional transmission after applying them to the corresponding channels of signal spectrum correction.

All transmitted pilot signals, pilot signals for transmit diversity, and information signal are mutually orthogonal or quasi-orthogonal.

$L_m$ sets of weighting coefficients of transmission direction each having K-1 weighting coefficients of transmission direction are formed at the mobile station for each of M diverse groups of transmission channels using the estimated impulse responses of M·K transmission channels of diverse groups in such a way that a spatial correlation matrix $\hat{R}_{m,n}$ is formed for each of M diverse groups of transmission channels for all of N resolvable paths of the transmitted pilot signals, where $N \geq 1$, as follows $$\hat{R}_{m,n} = \begin{bmatrix} h_{m,1,n} \\ h_{m,2,n} \\ \vdots \\ h_{m,K,n} \end{bmatrix} \cdot [(h_{m,1,n})^* \quad (h_{m,2,n})^* \quad \ldots \quad (h_{m,K,n})^*],$$

where $h_{m,k,n}$ is a coefficient of the estimated impulse response of transmission channel k of diverse group m corresponding to a resolvable path n of the transmitted pilot signals, $m=1,2,\ldots,M$, $k=1,2,\ldots,K$, $n=1,2,\ldots,N$, $x^*$ is an operation of complex conjugation of x, a spatial correlation matrix $\hat{R}_m$ of all resolvable paths is formed for each of M diverse groups of transmission channels as follows $$\hat{R}_m = \sum_{n=1}^{N} \hat{R}_{m,n};$$

an averaged spatial correlation matrix $\hat{R}_m(i)$, where $i \geq 1$ is the number of an averaging step, is formed for each of M diverse groups of transmission channels as follows $$\hat{R}_m(i) = \begin{cases} \hat{R}_m, & i=1; \\ \alpha \hat{R}_m(i-1) + (1-\alpha)\hat{R}_m, & i>1; \end{cases}$$

where $0 \leq \alpha \leq 1$ is an averaging coefficient,
the averaged spatial correlation matrix $\hat{R}_m(i)$ is decomposed into eigen values $\theta_{m,k}$ and the corresponding eigen vectors $\vec{V}_{m,k}$, where $k=1,2,\ldots,K$, the maximum eigen value $\theta_{m,max}$ is selected among eigen values $\theta_{m,k}$, such eigen values $\theta_{m,j}$ are selected among all eigen values that $\theta_{m,j} \geq \beta \cdot \theta_{m,max}$,
where $0 \leq \beta \leq 1$, $j=1,2,\ldots,L_m$, and $L_m$ is equal to the number of eigen values $\theta_{m,j}$, for which this condition is satisfied,
$L_m$ eigen vectors $\vec{V}_{m,j}$ corresponding to $L_m$ selected eigen values $\theta_{m,j}$ are selected,
$L_m$ sets of weighting coefficients of transmission direction each having K−1 weighting coefficients of transmission direction are formed as follows $$W_{m,j,k} = \frac{V_{m,j,k}}{V_{m,j,1}},$$

where
$W_{m,j,k}$ is the k-th transmission direction weighting coefficient of the j-th set of transmission direction weighting coefficients of the m-th diverse group of transmission channels,
$V_{m,j,k}$ is the k-th element of the j-th eigen vector of the averaged spatial correlation matrix of the m-th diverse group of transmission channels, $m=1,2,\ldots,M$, $j=1,2,\ldots,L_m$, $k=2,3,\ldots,K$.

Transfer functions of channels of directional transmission corresponding to each of $L_m$ sets of weighting coefficients of transmission direction of all M diverse groups of transmission channels are estimated at the mobile station in such a way that an impulse response of each channel of directional transmission is formed as follows $$H_{m,j} = \sum_{k=1}^{K} W_{m,j,k} \cdot h_{m,k}$$

$$W_{m,j,1} \equiv 1,$$

where
where $W_{m,j,k}$ is the k-th transmission direction weighting coefficient of the j-th set of transmission direction weighting coefficients of the m-th diverse group of transmission channels,
$m=1,2,\ldots,M$, $j=1,2,\ldots,L_m$, $k=1,2,\ldots,K$, $$h_{m,k} = \sum_{n=1}^{N} h_{m,k,n} \cdot \delta(t - \tau_n)$$

is impulse response of the k-th transmission channel of the m-th diverse group of transmission channels,
where $h_{m,k,n}$ is a coefficient of the estimated impulse response of the k-th transmission channel of the m-th diverse group of transmission channels corresponding to the n-th resolvable path of transmitted pilot signals, $\tau_n$ is a delay of the n-th resolvable path of transmitted pilot signals, $m=1,2,\ldots,M$, $k=1,2,\ldots,K$, $n=1,2,\ldots,N$;
an estimate of the transfer function of this channel of directional transmission is equal to the Fourier transform of the formed impulse response $H_{m,j}$ of this channel of directional transmission.

$L_m$ channels of directional transmission are formed at the base station for each of M diverse groups of transmission channels using the transmitted sets of weighting coefficients of transmission direction in such a way that in each of $L_m$ channels of directional transmission K copies of an input signal of this channel of directional transmission are formed and transmitted over the corresponding transmission channel of this diverse group of transmission channels once each copy, starting from the second one, has been multiplied by the corresponding weighting coefficient of transmission direction of the respective set of weighting coefficients of transmission direction.

For each of M diverse groups of transmission channels an estimate of the transfer function of each of $L_m$ channels of directional transmission, obtained using K pilot signals transmitted from this diverse group of transmission channels, is combined with an estimate of its transfer function, obtained using a pilot signal for transmit diversity transmitted from this diverse group of transmission channels, in such a way that these two estimates are averaged with weights that are inversely proportional to error metrics of these estimates.

The goal of the present invention is achieved by the data transmission method according to the fourth embodiment, such that M diverse groups of transmission channels each having K transmission channels are formed at the base station, where $M \geq 1$, $K \geq 1$;

according to the invention

M diverse groups of receiving channels each having K receiving channels corresponding to M formed diverse groups of transmission channels are formed at the base station;

a signal is transmitted from the mobile station to the base station and received at the base station in each of K receiving channels of each of M diverse groups, $L_m$ sets of weighting coefficients of transmission direction each having K coefficients are formed for each of M diverse groups of transmission channels using the signal received from the mobile station in such a way that the reception quality of the base station signal received at the mobile station is maximized, where $L_m \geq 0$ and $m=1,2,\ldots,M$;

$L_m$ channels of directional transmission are formed at each of M diverse groups of transmission channels using the formed sets of weighting coefficients of transmission direction;

pilot signals for transmit diversity are transmitted to the mobile station from each of M diverse groups of transmission channels over each of $L_m$ channels of directional transmission;

transfer functions of all $L_m$ channels of directional transmission are estimated at the mobile station for each of M diverse groups of transmission channels using the transmitted pilot signals for transmit diversity;

a feedback signal containing $L_m$ estimated transfer functions of directional transmission channels for each of M diverse groups of transmission channels is transmitted to the base station;

channels of signal spectrum correction are formed at the base station for each of M diverse groups of transmission channels for each of $L_m$ channels of directional transmission and their transfer functions are corrected according to the transmitted estimated transfer functions of directional transmission channels in such a way that the reception quality of the information signal at the mobile station is maximized;

information signal copies are formed for all $L_m$ channels of directional transmission for all M diverse groups of transmission channels and all formed copies of the information signal are simultaneously transmitted over the corresponding channels of directional transmission after applying them to the respective channels of signal spectrum correction.

A signal transmitted from the mobile station to the base station is a pilot signal, or an information signal, or a feedback signal, or a control signal, or any combination of these signals.

$L_m$ sets of weighting coefficients of transmission direction each having K coefficients are formed for each of M diverse groups of transmission channels in such a way that directions of arrival and the corresponding receiving powers of the received signal are estimated for each of M diverse groups of receiving channels, $L_m$ directions corresponding to $L_m$ maximum average values of received signal power are selected for each of M diverse groups of receiving channels, $L_m$ sets of weighting coefficients of transmission direction each having K coefficients of transmission direction are formed for each of M diverse groups of transmission channels in $L_m$ directions of signal arrival selected for the corresponding diverse group of reception channels in such a way that the reception quality of the signal transmitted from the base station to the mobile station is maximized.

The channels of directional transmission are formed in such a way that in each channel of directional transmission K copies of an input signal of this channel of directional transmission are formed and transmitted over the corresponding transmission channel, once each copy of the input signal has been multiplied by the corresponding weighting coefficient of transmission direction of the respective set of weighting coefficients of transmission direction.

All transmitted pilot signals for directional transmission and the information signal are mutually orthogonal or quasi-orthogonal.

Transfer functions of all $L_m$ channels of directional transmission are estimated at the mobile station for each of M diverse groups of transmission channels using the transmitted pilot signals for transmit diversity in such a way that the estimate of transfer function of each channel of directional transmission is equal to Fourier transform of the estimated impulse response of this channel of directional transmission. Channels of signal spectrum correction are formed at the base station for each of M diverse groups of transmission channels for each of $L_m$ channels of directional transmission in such a way that the transfer function of each channel of signal spectrum correction is equal to a complex conjugate of the corresponding estimated transfer function of channel of directional transmission.

The object of the invention is also achieved by the apparatus for data transmission according to the first embodiment (used to implement the method according to the first embodiment) that comprises M blocks of directional transmission, M·K summation blocks, M·K analog transmitters, M·K antenna elements, such that the second inputs of each of M blocks of directional transmission are inputs of the corresponding weighting coefficients of transmission direction, each of K outputs of each of M blocks of directional transmission is connected to the second input of the corresponding summation block, the first input of each of M·K summation blocks is an input of the corresponding pilot signal, outputs of summation blocks are connected to inputs of the corresponding analog transmitters, their outputs are connected to inputs of corresponding antenna elements, their outputs are outputs of the apparatus for data transmission, which differs in that another $$\sum_{m=1}^{M}(L_m-1)$$

blocks of directional transmission and $$\sum_{m=1}^{M}L_m$$

blocks of signal spectrum correction are added, where the first input of each of $$\sum_{m=1}^{M}L_m$$

blocks of signal spectrum correction is an information signal input, the second input of each of $$\sum_{m=1}^{M}L_m$$

blocks of signal spectrum correction is an input of the corresponding transfer function of channel of directional transmission, an output of each of $$\sum_{m=1}^{M}L_m$$

blocks of signal spectrum correction is connected to the first input of the corresponding block of directional transmission, each of K outputs of each of $$\sum_{m=1}^{M}(L_m-1)$$

additional blocks of directional transmission is connected to ($L_m-1$) additional second inputs of the corresponding summation block, where m takes on the values from 1 to M.

The second embodiment of the apparatus for data transmission (used to implement the method of data transmission according to the second and third embodiments) that includes M blocks of directional transmission, M·K summation blocks, M·K analog transmitters, M·K antenna elements, is provided such that the second inputs of each of M blocks of directional transmission are inputs of the corresponding weighting coefficients of transmission direction, each of K outputs of each of M blocks of directional transmission is connected to the second input of the corresponding summation block, the first input of each of M·K summation blocks is an input of the corresponding pilot signal, outputs of summation blocks are connected to inputs of the corresponding analog transmitters, whose outputs are connected to inputs of the respective antenna elements, the outputs of which are outputs of the apparatus for data transmission, which differs in that $$\sum_{m=1}^{M}(L_m-1)$$

additional blocks of directional transmission, $$\sum_{m=1}^{M}L_m$$

blocks of signal spectrum correction, and $$\sum_{m=1}^{M}L_m$$

summators are added, where the first input of each of $$\sum_{m=1}^{M}L_m$$

blocks of signal spectrum correction is an input of the information signal, the second input of each of $$\sum_{m=1}^{M}L_m$$

blocks of signal spectrum correction is an input of the corresponding transfer function of a channel of directional transmission, an output of each of $$\sum_{m=1}^{M}L_m$$

blocks of signal spectrum correction is connected to the first input of the corresponding summator, the second input of each of $$\sum_{m=1}^{M}L_m$$

summators is an input of the corresponding pilot signal for transmit diversity, an output of each of $$\sum_{m=1}^{M}L_m$$

summators is connected to the first input of the corresponding block of directional transmission, each of K outputs of each of $$\sum_{m=1}^{M}(L_m-1)$$

additional blocks of directional transmission is connected to ($L_m-1$) additional second inputs of the corresponding summation block, where m takes on the values from 1 to M.

The third embodiment of the apparatus for data transmission (used to implement the method of data transmission according to the fourth embodiment) is provided, including M blocks of directional transmission,
M·K summation blocks,
M·K analog transmitters,
M·K antenna elements,
such that
outputs of each of M blocks of directional transmission are connected to inputs of the corresponding summation blocks,
an output of each of M·K summation blocks is connected to an input of the corresponding analog transmitter,
an output of each of M·K analog transmitters is connected to the first input of the corresponding antenna element,
the first output of each of M·K antenna elements is an output of the apparatus for data transmission, which differs in that $$\sum_{m=1}^{M}(L_m-1)$$

additional blocks of directional transmission, $$\sum_{m=1}^{M}L_m$$

blocks of signal spectrum correction, $$\sum_{m=1}^{M}L_m$$

summators,
M·K analog receivers,
and M weighting coefficients of transmission direction forming blocks are added,
where
the first input of each of $$\sum_{m=1}^{M}L_m$$

blocks of signal spectrum correction is an input of the information signal,
the second input of each of $$\sum_{m=1}^{M}L_m$$

blocks of signal spectrum correction is an input of the corresponding transfer function of channel of directional transmission,
an output of each of $$\sum_{m=1}^{M}L_m$$

blocks of signal spectrum correction is connected to the first input of the corresponding summator,
the second input of each of $$\sum_{m=1}^{M}L_m$$

summators is an input of the corresponding pilot signal for transmit diversity,
an output of each of $$\sum_{m=1}^{M}L_m$$

summators is connected to the first input of the corresponding block of directional transmission,
K second inputs of each of $$\sum_{m=1}^{M}L_m$$

blocks of directional transmission are connected to the corresponding K outputs of the respective weighting coefficients of transmission direction forming block,
outputs of each of $$\sum_{m=1}^{M}(L_m-1)$$

additional blocks of directional transmission are connected to additional inputs of the corresponding summation blocks, the second input of each of M·K antenna elements in an input of the receiving signal,
the second output of each of M·K antenna elements is connected to an input of the corresponding analog receiver,
an output of each of M·K analog receivers is connected to the corresponding input of the respective weighting coefficients of transmission direction forming block.

The block of directional transmission consists of
K multipliers, where
combined first inputs of K multipliers are the first input of the block of directional transmission,
their second inputs are the second inputs of the block of directional transmission,
and their outputs are outputs of the block of directional transmission.

The claimed method (embodiments) and apparatus (embodiments) for data transmission substantially differ from the known technical solutions. These distinctive features as a whole increase the efficiency of the information signal transmission in downlink and, hence, maximize the information signal reception quality at a mobile station as well as reduce the feedback channel load. The novel features of the claimed invention are as follows.

First, an operation of the information signal copies spectra correction is introduced instead of multiplication of the information signal copies by weighting coefficients of diversity (as in prior art) and blocks of signal spectrum correction are used instead of multipliers. This ensures coherent addition of the information signal copies on the receiver side in a frequency-selective fading environment.

Secondly, transmission in several directions from each diverse group of transmission channels is carried out instead of transmission in one direction from each diverse group of transmission channels (as in prior art). The corresponding sets of weighting coefficients of transmission direction are formed at the mobile station. The corresponding number of blocks of transmission direction are added to the claimed apparatus for data transmission. This increases the number of transmission channels essentially and, hence, improves the efficiency of fading averaging.

Then, the claimed method (according to the second and the fourth embodiments) and apparatus (according to the second and the third embodiments) for data transmission estimate the transfer functions of directional transmission channels using the pilot signals for transmit diversity, transmitted in each transmission direction. This provides higher quality of transfer functions of directional transmission channels estimation and, thereby, improves the efficiency of coherent addition of the information signal copies on the receiver side, which enhances the mobile station reception quality.

Moreover, the claimed method (according to the third embodiment) and apparatus (according to the second embodiment) for data transmission estimate the transfer functions of directional transmission channels using both the pilot signals transmitted from each antenna element and the pilot signals for transmit diversity transmitted in each of these transmission directions. These estimates are later combined. This improves the quality of transfer functions of directional transmission channels estimation and, thereby, raises the efficiency of coherent addition of the information signal copies on the receiver side, which improves the mobile station reception quality.

Furthermore, the claimed method (according to the fourth embodiment) and apparatus (according to the third embodiment) for data transmission handle the formation of the weighting coefficients of transmission direction at the base station using the pilot signal received from the mobile station. The device for data transmission includes M·K analog receivers and M weighting coefficients of transmission direction forming blocks. Consequently, there is no need to transmit the sets of weighting coefficients of transmission direction from the mobile to the base station, which reduces the feedback signal (from the mobile station to the base station) load significantly.

The claimed method of data transmission according to the first embodiment and the apparatus for implementing the same according to the first embodiment, the method according to the second and the third embodiments and the apparatus implementing the same according to the second embodiment correspond to the patent application with the convention priority of the 9th of Mar. 2004, filed with the Russian Patent Office (RU) # 2004107061. The claimed method of data transmission according to the fourth embodiment and the apparatus implementing the same according to the third embodiment correspond to the patent application with the convention priority of the 18th of May 2004, filed with the Russian Patent Office (RU) # 2004114907. The inventions are combined in a single international patent application because they relate to one group of inventions, connected with each other in such a way that they form a single invention concept, relate to the objects fulfilling a common purpose and provide the same technical results, that is, increasing the efficiency of the information signal transmission in downlink and, hence, maximizing the information signal reception at the mobile station and reducing the feedback load.

BRIEF DESCRIPTION OF THE DRAWINGS

The description of the invention is provided below with reference to the accompanying drawings and embodiments.

DETAILED DESCRIPTION OF THE PREFERRED EMBODIMENTS

Figure 1:
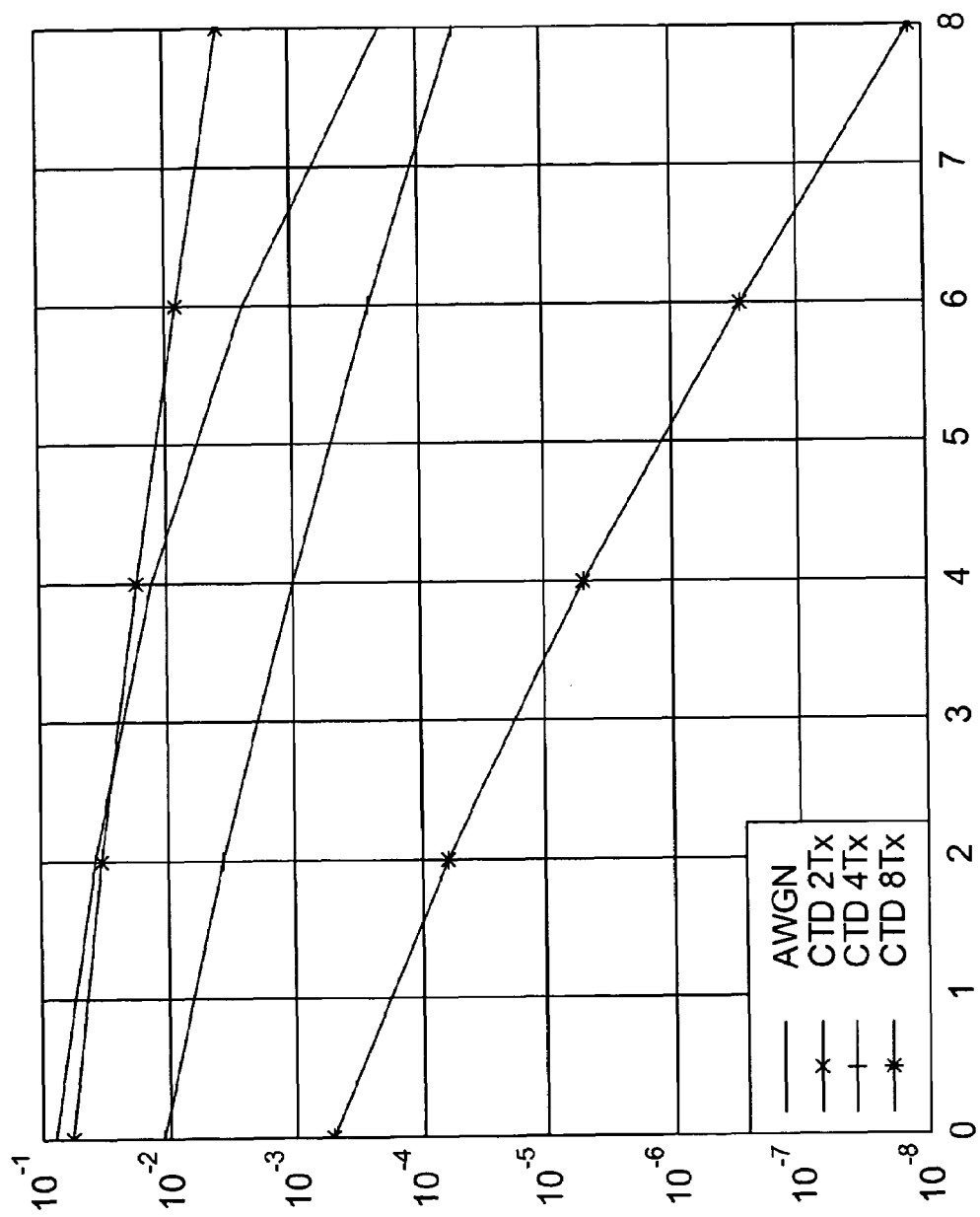
FIG. 1 shows bit error rate as a function of SINR (interference plus noise ratio) in a propagation channel with Rayleigh fading and additive Gaussian interference.
Figure 2:
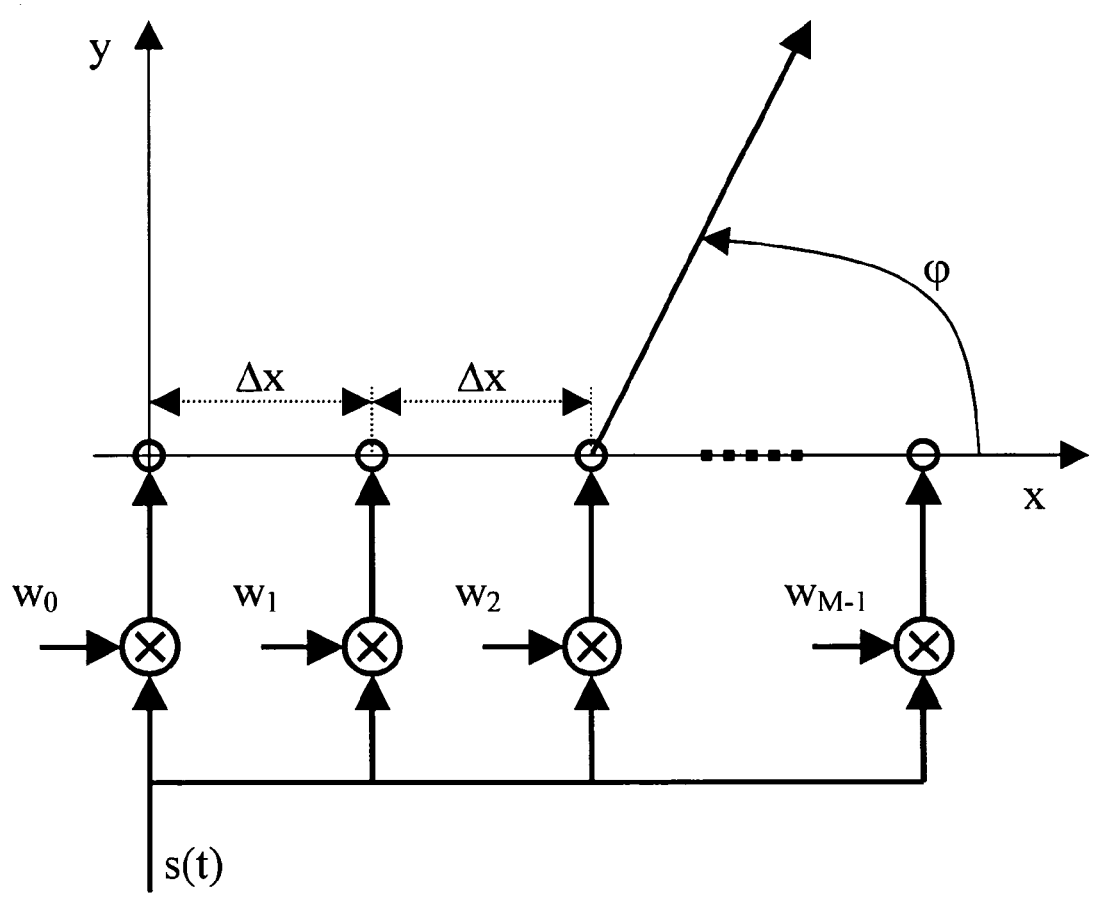
FIG. 2 depicts a linear equidistant antenna array.
Figure 3:
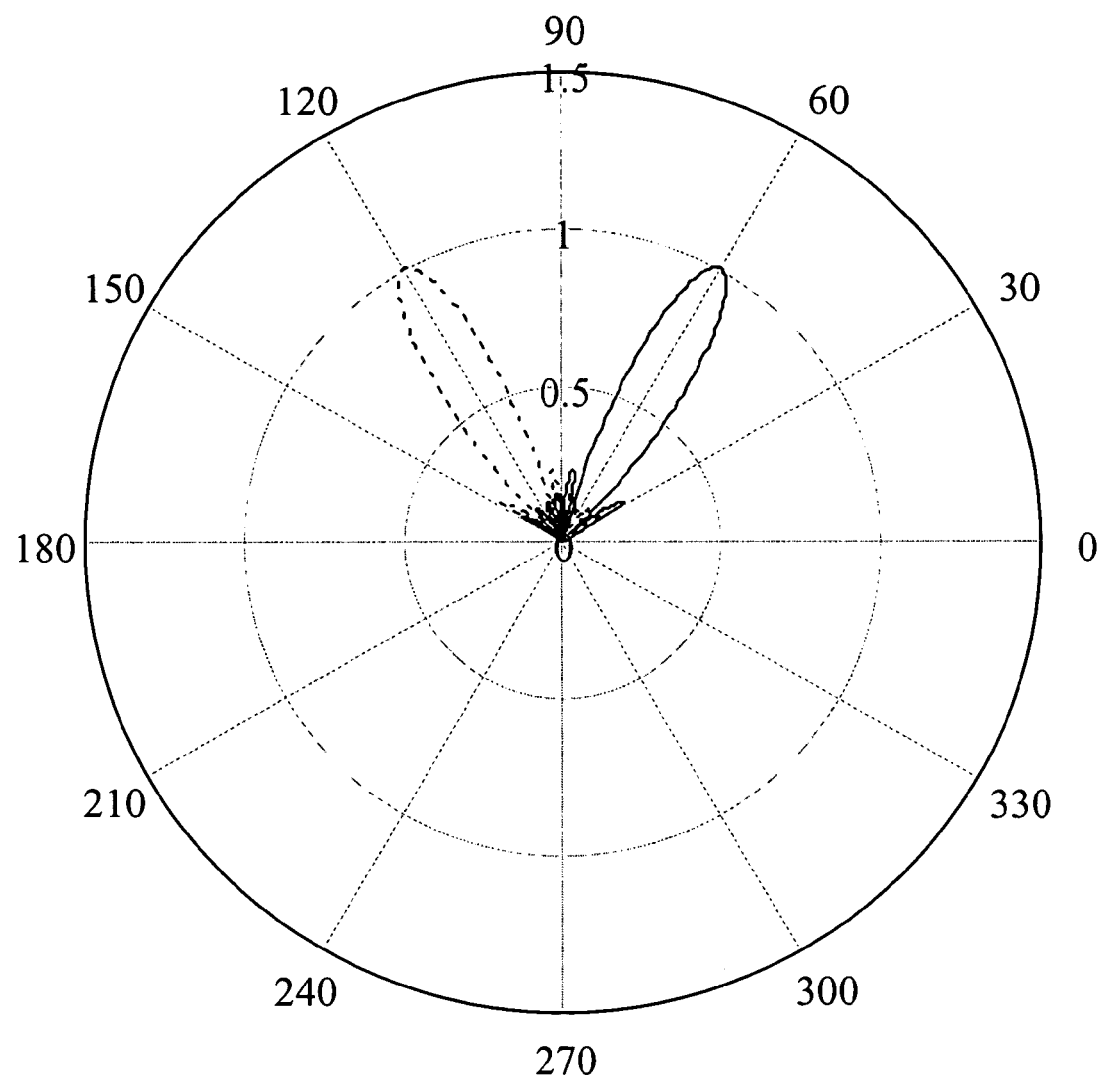
FIG. 3 illustrates antenna patterns of the adaptive antenna array.

The claimed apparatus for data transmission according to the first embodiment (FIG. 9) contains $$\sum_{m=1}^{M} L_m$$

blocks of signal spectrum correction 7-1-1-7-M-$L_M$, $$\sum_{m=1}^{M} L_m$$

blocks of directional transmission 2-1-1-2-M-$L_M$, M·K summation blocks 3-1-1-3-M-K, M·K analog transmitters 4-1-1-4-M-K, M·K antenna elements 5-1-1-5-M-K, where the combined first inputs of the blocks of signal spectrum correction 7-1-1-7-M-$L_M$ are the information signal inputs, their second inputs are inputs of the corresponding transfer functions of the directional transmission channel;

the outputs of the blocks of signal spectrum correction 7-1-1-7-M-$L_M$ are connected with the first inputs of the respective blocks of directional transmission 2-1-1-2-M-$L_M$, the second inputs of which are the inputs of the corresponding weighting coefficients of directional transmission, K outputs of each directional transmission block 2-1-1-2-M-$L_M$ are linked with the second inputs of the corresponding summation blocks 3-1-1-3-M-K, the first inputs of which are inputs of the corresponding pilot signals;

the outputs of the summation blocks 3-1-1-3-M-K are linked with the inputs of the corresponding analog transmitters 4-1-1-4-M-K, the outputs of which are connected with the inputs of the corresponding antenna elements 5-1-1-5-M-K, whose outputs are the outputs of the data transmission apparatus.

The claimed apparatus for data transmission according to the second embodiment (FIG. 10) contains $$\sum_{m=1}^{M} L_m$$

blocks of signal spectrum correction 7-1-1-7-M-L$_M$, $$\sum_{m=1}^{M} L_m$$

summators 8-1-1-8-M-L$_M$, $$\sum_{m=1}^{M} L_m$$

blocks of directional transmission 2-1-1-2-M-L$_M$, M·K summation blocks 3-1-1-3-M-K, M·K analog transmitters 4-1-1-4-M-K, M·K antenna elements 5-1-1-5-M-K, where the combined first inputs of the blocks of signal spectrum correction 7-1-1-7-M-L$_M$ are the information signal inputs, their second inputs are inputs of the corresponding transfer functions of the directional transmission channel;

the outputs of blocks of signal spectrum correction 7-1-1-7-M-L$_M$ are connected with the first inputs of the corresponding summators 8-1-1-8-M-L$_M$, the second inputs of which are the inputs of the corresponding pilot signals for transmit diversity, the outputs of summators 8-1-1-8-M-L$_M$ are connected with the first inputs of the corresponding blocks of directional transmission 2-1-1-2-M-L$_M$, the second inputs of which are inputs of the corresponding weighting coefficients of transmission direction, K outputs of each block of directional transmission 2-1-1-2-M-L$_M$ are connected with the second inputs of the corresponding summation blocks 3-1-1-3-M-K, the first inputs of which are the inputs of the corresponding pilot signals, the outputs of summation blocks 3-1-1-3-M-K are connected with the inputs of the corresponding analog transmitters 4-1-1-4-M-K, whose outputs are connected with the inputs of the corresponding antenna elements 5-1-1-5-M-K, the outputs of which are the outputs of the data transmission apparatus.

The claimed apparatus for data transmission according to the third embodiment (FIG. 11) includes $$\sum_{m=1}^{M} L_m$$

blocks of signal spectrum correction 7-1-1-7-M-L$_M$, $$\sum_{m=1}^{M} L_m$$

summators 8-1-1-8-M-L$_M$, $$\sum_{m=1}^{M} L_m$$

blocks of directional transmission 2-1-1-2-M-L$_M$, M·K summation blocks 3-1-1-3-M-K, M·K analog transmitters 4-1-1-4-M-K, M·K antenna elements 5-1-1-5-M-K, M·K analog receivers 9-1-1-9-M-K, M weighting coefficients of transmission direction forming blocks 10-1-10-M, where the combined first inputs of signal spectrum correction blocks 7-1-1-7-M-L$_M$ are the information signal inputs, their second inputs are the inputs of the corresponding transfer functions of a directional transmission channel, the outputs of signal spectrum correction blocks 7-1-1-7-M-L$_M$ are connected with the first inputs of the corresponding summators 8-1-1-8-M-L$_M$, whose second inputs are the inputs of the corresponding pilot signals for transmit diversity, outputs of summators 8-1-1-8-M-L$_M$ are connected with the first inputs of the corresponding blocks of directional transmission 2-1-1-2-M-L$_M$, the second inputs of which are connected with the corresponding outputs of the respective weighting coefficients of transmission direction forming blocks 10-1-10-M, each of K outputs of each directional transmission block 2-1-1-2-M-L$_M$ is connected with the corresponding input of the respective summation block 3-1-1-3-M-K, the outputs of summation blocks 3-1-1-3-M-K are connected with the inputs of the respective analog transmitters 4-1-1-4-M-K, whose outputs are linked with the first inputs of the corresponding antenna elements 5-1-1-5-M-K, whose first outputs are the outputs of data transmission apparatus, the second inputs of antenna elements 5-1-1-5-M-K are the received signal inputs, the second outputs of antenna elements 5-1-1-5-M-K are connected with the inputs of the respective analog receivers 9-1-1-9-M-K, whose outputs are connected with the corresponding inputs of the respective weighting coefficients of transmission direction forming blocks 10-1-10-M.

Figure 8:
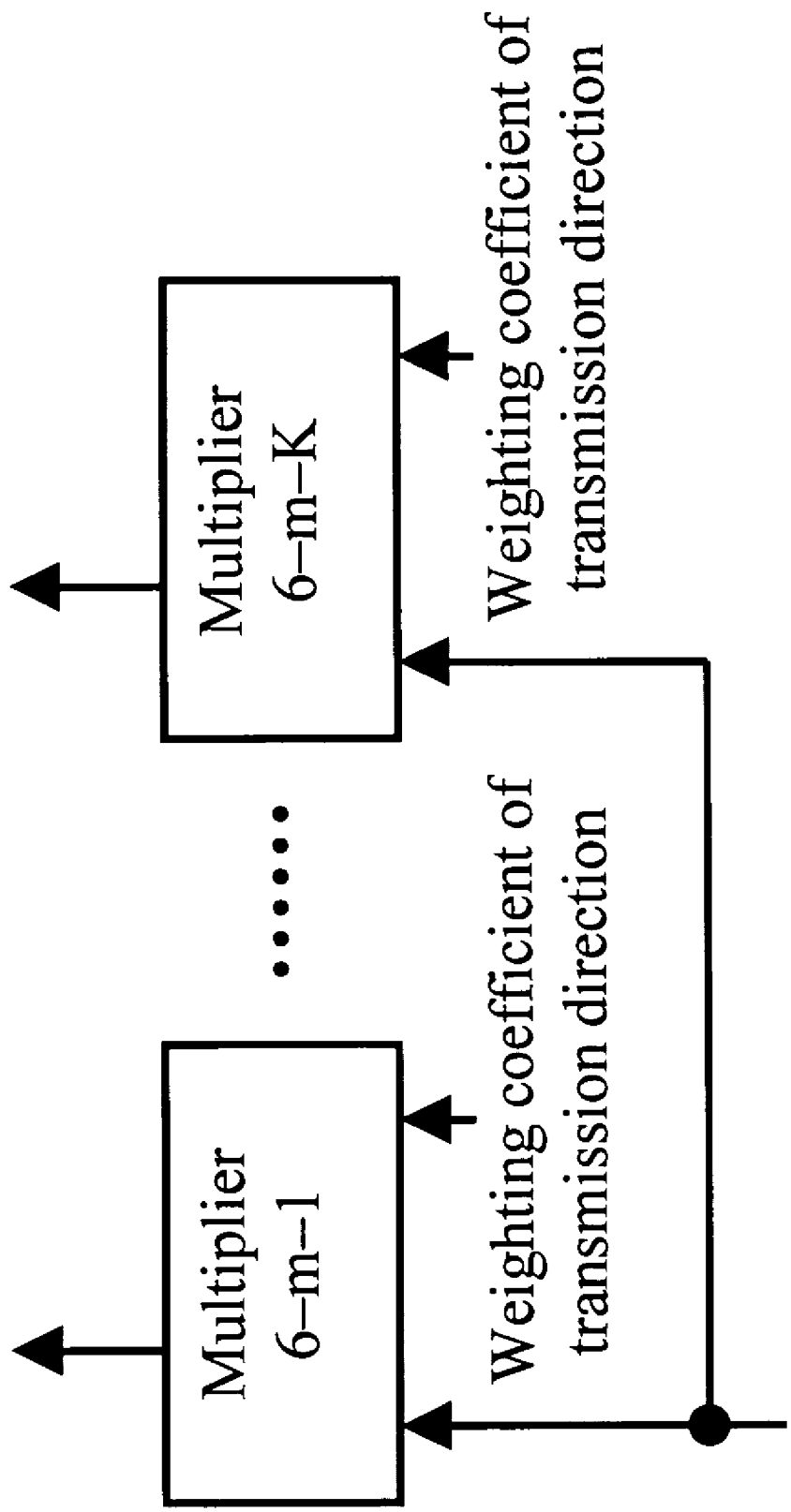
FIG. 8 is a block-diagram of the directional transmission block, given as an exemplary embodiment.

Each block of directional transmission 2-1-1-2-M-L$_M$ (FIG. 8) contains K multipliers 6-m-1-6-m-K, such that the combined first inputs of K multipliers 6-m-1-6-m-K are the first input of the directional transmission block, their second inputs are the second inputs of the directional transmission block, and their outputs are the outputs of the directional transmission block.

In what follows the embodiments of the method of data transmission according to the invention are described with reference to the aforementioned apparatus and FIGS. 9-11.

Figure 9:
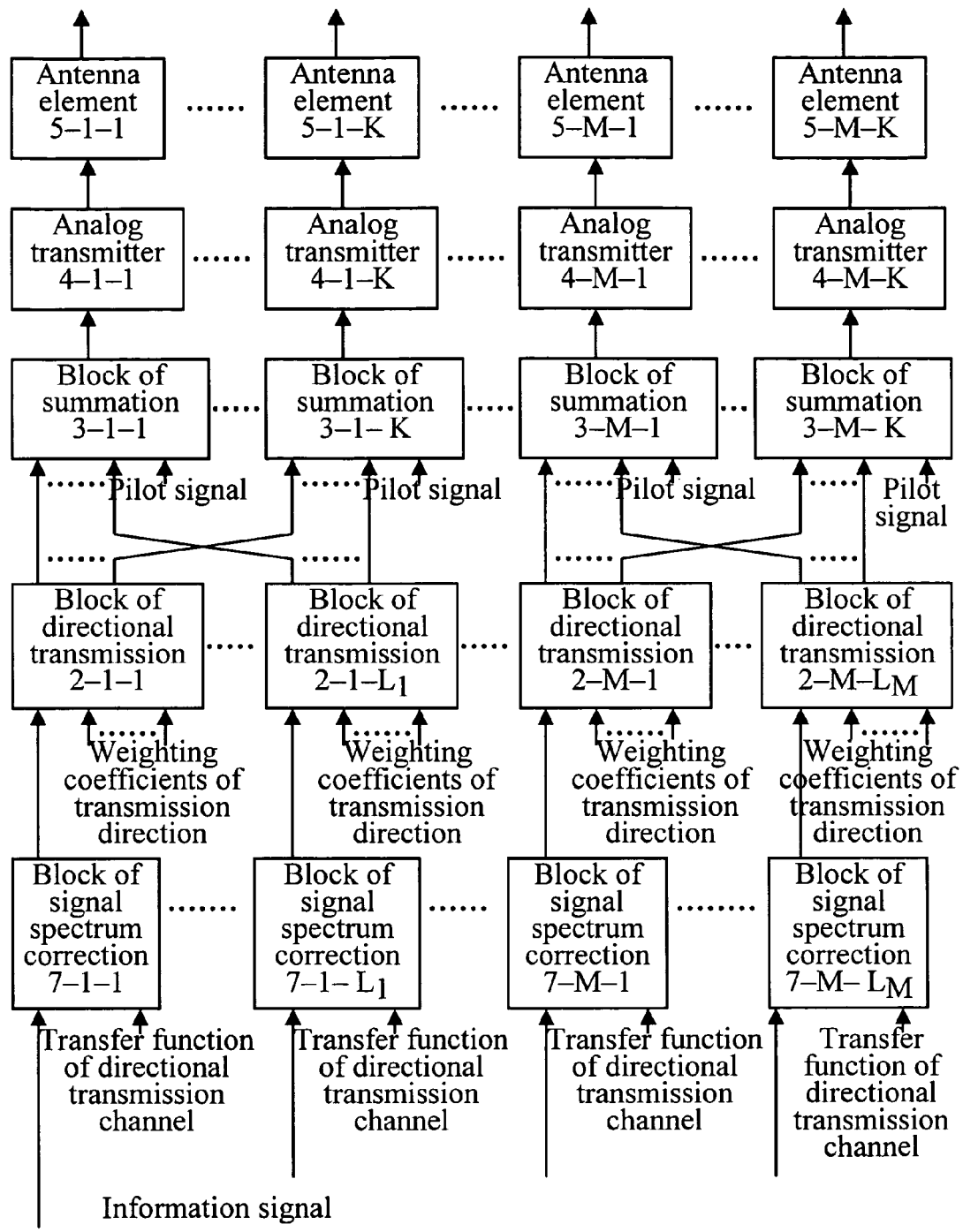
FIG. 9 is a block-diagram of the claimed apparatus for data transmission according to the first embodiment.

The method for data transmission according to the first embodiment is implemented using the apparatus the block-diagram of which is shown in FIG. 9.

M diverse groups of transmission channels each having K transmission channels, where M≧1, K≧1, are formed at the base station.

Each of M·K transmission channels is formed by the corresponding analog transmitter 4-m-k and the corresponding antenna element 5-m-k, where m takes on the values from 1 to M, and k takes on the values from 1 to K.

Each of M diverse groups of transmission channels is formed by the corresponding block of directional transmission, one of 2-m-j blocks, where j takes on the values from 1 to L$_m$, the corresponding analog transmitters 4-m-1-4-m-K and the respective antenna elements 5-m-1-5-m-K.

Each diverse group of transmission channels is an adaptive antenna array. The total of M adaptive antenna arrays are used for transmission.

Pilot signals are transmitted from the base station to the mobile station from all M·K transmission channels of diverse groups.

Each of M·K pilot signals arrives at the first input of the corresponding summation block 3-m-k, from the output of which it fed to the input of the corresponding analog transmitter 4-m-k, from the output of which it is applied to the input of the corresponding antenna element 5-m-k, whose output is the output of the apparatus for data transmission.

As each pilot signal is transmitted only over one transmission channel, it is transmitted non-directionally, that is with the antenna pattern equal to that of one antenna element.

All transmitted pilot signals and the information signal are mutually orthogonal or quasi-orthogonal.

Pilot signals are regarded as orthogonal or quasi-orthogonal when the maximum value of a correlation function between any two pilot signals is much less than the maximum value of an auto-correlation function of each pilot signal.

Impulse responses of M·K transmission channels of diverse groups are estimated at the mobile station using the transmitted pilot signals.

The estimation may be performed using the known methods, for example, as described by A. Hewitt, W. Lau, J. Austin, and E. Wilar in "An autoregressive approach to the identification of multipath ray parameters from field measurements," IEEE Trans. on Comm., vol. 37, pp. 1136-1143, November 1989 or by J. Ehrenberg, T. Ewart, and R. Morris in "Signal processing techniques for resolving individual pulses in a multipath signal," J. Acoust. Soc. Amer., vol. 63, pp. 1861-1865, June 1978, or by Zoran Kostic, M. Ibrahim Sezan, and Edward L. Titlebaum in "Estimation of the parameters of a multipath channel using set-theoritic deconvolution," IEEE Trans. on Comm., vol. 40, No. 6, June 1992.

$L_m$ sets of weighting coefficients of transmission direction each having K−1 weighting coefficients of transmission direction are formed at the mobile station for each of M diverse groups of transmission channels using the estimated impulse responses of M·K transmission channels of diverse groups, where $1 \leq L_m \leq K$ and m=1,2, ..., M.

Figure 4:
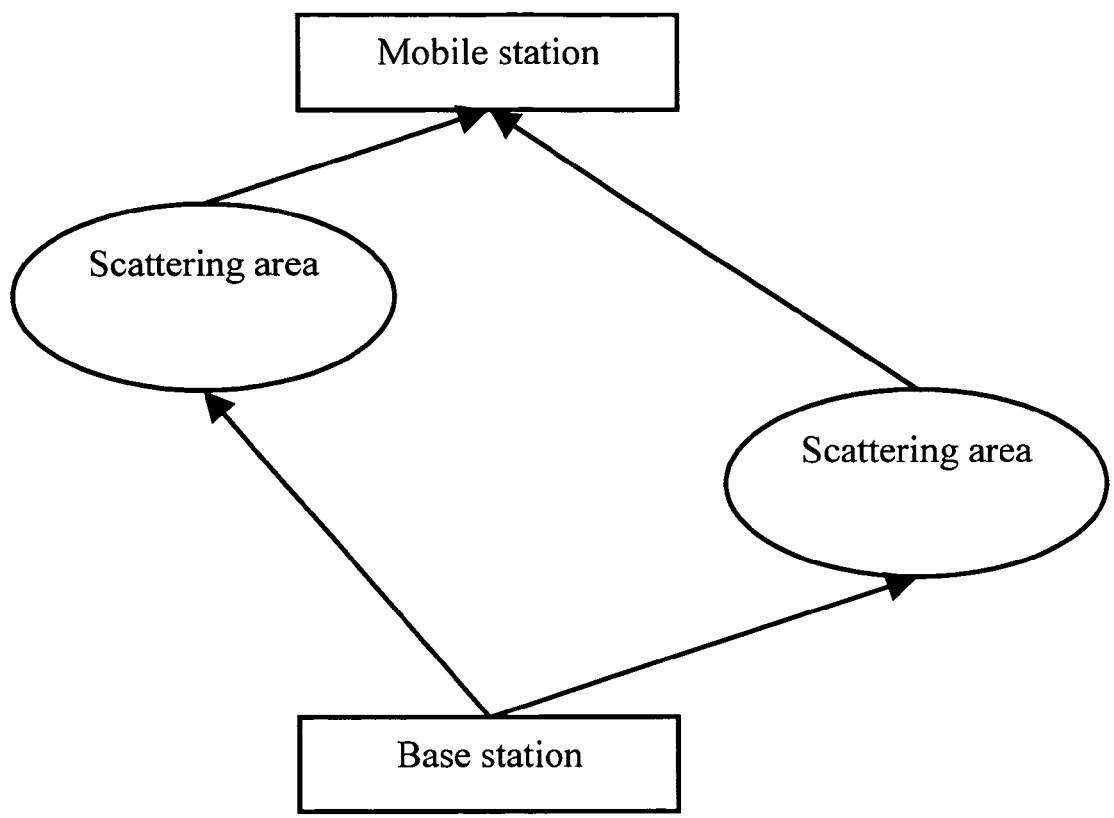
FIG. 4 shows a propagation channel from the base to the mobile station.
Figure 5:
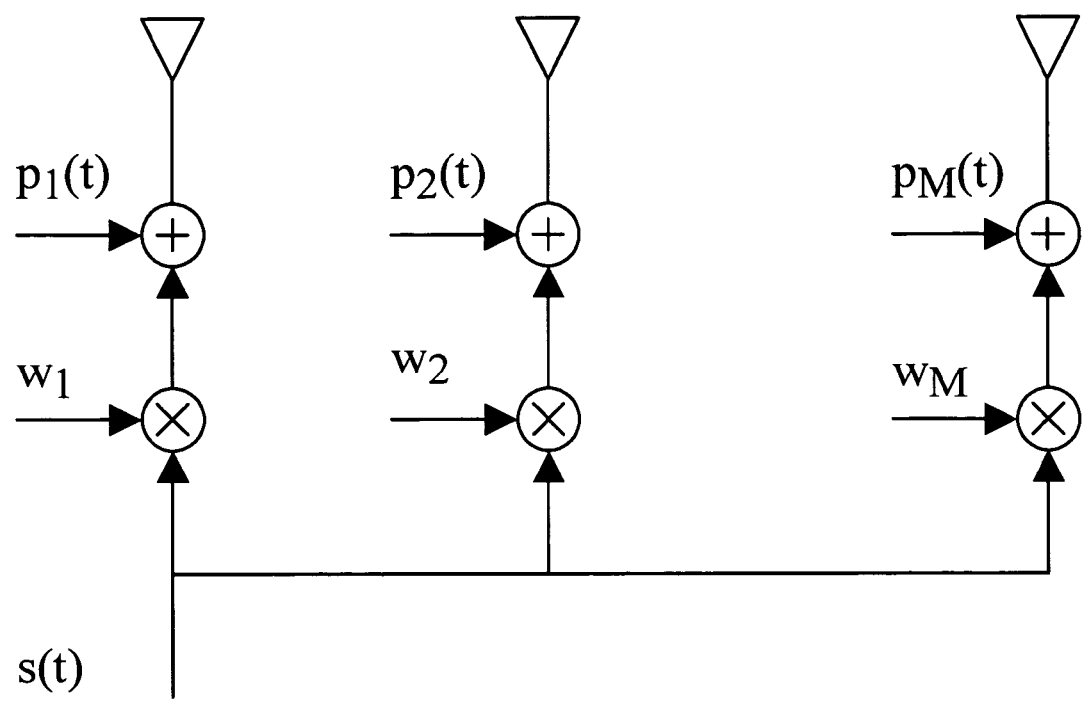
FIG. 5 illustrates an exemplary embodiment of the known solution described in Siemens, Advanced closed loop Tx diversity concept (eigenbeamformer), 3GPP TSG RAN WG 1 document, TSGR1#14(00) 0853, Jul. 4-7, 2000, Oulu, Finland.
Figure 6:
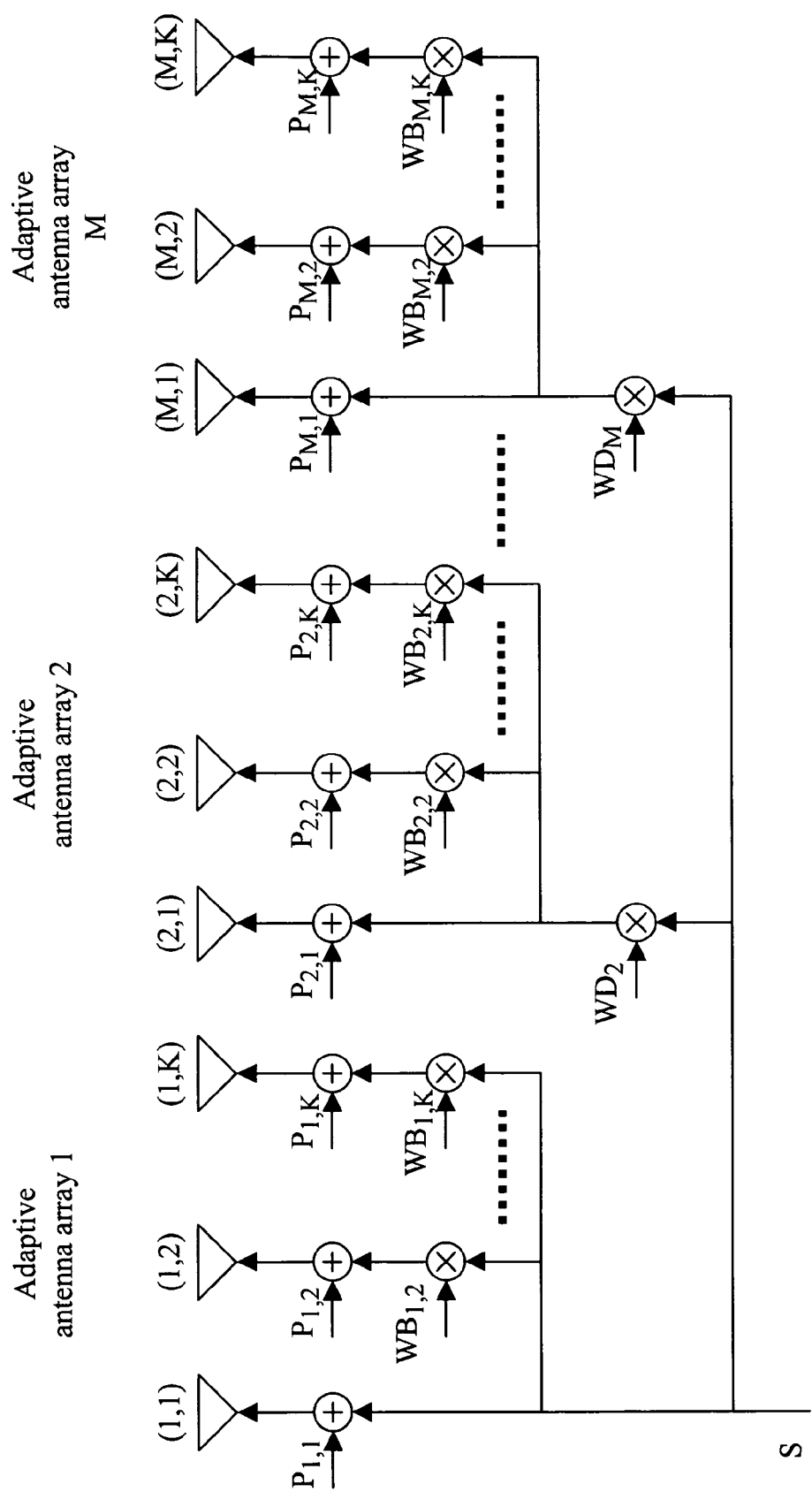
FIG. 6 depicts an implementation of the prior art method.
Figure 7:
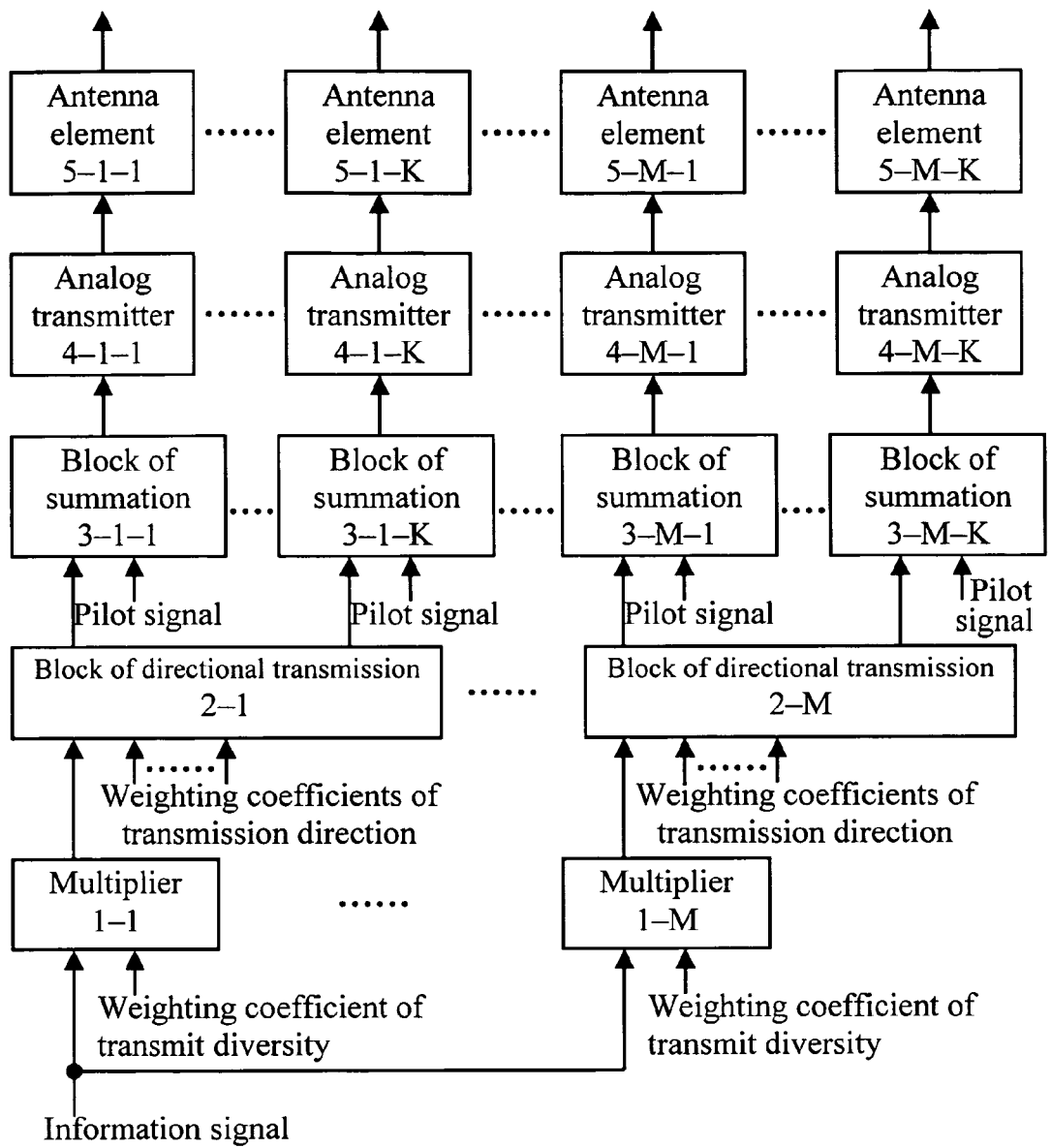
FIG. 7 illustrates a block-diagram of the prior art device.

As previously discussed, while describing the prior art found in Siemens, Advanced closed loop Tx diversity concept (eigenbeamformer), 3GPP TSG RAN WG 1 document, TSGR1#14(00)0853, Jul. 4-7, 2000, Oulu, Finland, usually, a propagation channel from the base station to the mobile station can include several scattering areas. A transmitted signal propagates over all of these areas before arriving to the mobile station (see FIG. 4). Therefore, there are several effective directions of transmission from the base to the mobile station. When transmitting in these directions, the energy will reach the mobile station and when transmitting in other directions, most part of transmitted energy will not reach the mobile station and will be blocked by buildings.

These effective transmission directions are determined at the mobile station for each diversity adaptive antenna array and the respective sets of weighting coefficients of transmission are generated.

For this purpose, the following is done at the mobile station.

A spatial correlation matrix $\hat{R}_{m,n}$ is formed for each of M diverse groups of transmission channels for all of N resolvable paths of the transmitted pilot signals, where $N \geq 1$, as follows $$\hat{R}_{m,n} = \begin{bmatrix} h_{m,1,n} \\ h_{m,2,n} \\ \vdots \\ h_{m,K,n} \end{bmatrix} \cdot [ (h_{m,1,n})^* \quad (h_{m,2,n})^* \quad \ldots \quad (h_{m,K,n})^* ],$$

where $h_{m,k,n}$ is a coefficient of the estimated impulse response of transmission channel k of diverse group m corresponding to resolvable path n of the transmitted pilot signals, m=1,2, ..., M, k=1,2, ..., K, n=1,2, ..., N, x* is an operation of complex conjugation of x.

The spatial correlation matrix $\hat{R}_m$ of all resolvable paths is formed for each of M diverse groups of transmission channels as follows $$\hat{R}_m = \sum_{n=1}^{N} \hat{R}_{m,n}.$$

The averaged spatial correlation matrix $\hat{R}_m(i)$, where $i \geq 1$ is the number of an averaging step, is formed for each of M diverse groups of transmission channels as follows $$\hat{R}_m(i) = \begin{cases} \hat{R}_m, & i=1; \\ \alpha \hat{R}_m(i-1) + (1-\alpha)\hat{R}_m, & i>1; \end{cases}$$

where $0 \leq \alpha \leq 1$ is an averaging coefficient.

The averaged spatial correlation matrix $\hat{R}_m(i)$ is decomposed into eigen values $\theta_{m,k}$ and the corresponding eigen vectors $\vec{V}_{m,k}$, where k=1,2, ..., K. The maximum eigen value $\theta_{m,max}$ is selected among eigen values $\theta_{m,k}$.

Such eigen values $\theta_{m,j}$ are selected among all eigen values that $\theta_{m,j} \geq \beta \cdot \theta_{m,max}$, where $0 \leq \beta \leq 1$, j=1,2, ..., $L_m$, and $L_m$ is equal to the number of eigen values $\theta_{m,j}$, for which this condition is satisfied.

$L_m$ eigen vectors $\vec{V}_{m,j}$ corresponding to $L_m$ selected eigen values $\theta_{m,j}$ are selected.

$L_m$ sets of weighting coefficients of transmission direction each having K−1 weighting coefficients of transmission direction are formed as follows $$W_{m,j,k} = \frac{V_{m,j,k}}{V_{m,j,1}},$$

where $W_{m,j,k}$ is the k-th transmission direction weighting coefficient of the j-th set of transmission direction weighting coefficients of the m-th diverse group of transmission channels, $V_{m,j,k}$ is the k-th element of the j-th eigen vector of an averaged spatial correlation matrix of the m-th diverse group of transmission channels, m=1,2, ..., M, j=1,2, ..., $L_m$, k=2,3, ..., K.

The claimed invention does not rule out the possibility that the effective transmission directions at the mobile station for each adaptive antenna array could be estimated in any other way. What is important is the operation of determining all or some of the effective directions for each antenna array.

Transfer functions of channels of directional transmission corresponding to each of $L_m$ sets of weighting coefficients of transmission direction of all M diverse groups of transmission channels are estimated at the mobile station. A transfer function (or frequency transmission factor) of a linear system as defined in literature, for example, by I. S. Gonorovsky in "Radioengineering circuits and signals", Moscow, "Soviet Radio", 1977, p. 176-177 or by S. I. Baskakov in "Radioengineering circuits and signals", M.-"Visshaya Shkola", 1988, p. 211-212, is a complex function equal to the quotient of spectral densities of the output and input signals of a linear system.

Transfer functions of directional transmission channels corresponding to each of $L_m$ sets of weighting coefficients of transmission direction of all M diverse groups of transmission channels are estimated at the mobile station. To do this, impulse response of each channel of directional transmission is formed as follows $$H_{m,j} = \sum_{k=1}^{K} W_{m,j,k} \cdot h_{m,k}$$

$$W_{m,j,1} \equiv 1,$$

where $W_{m,j,k}$ is the k-th transmission direction weighting coefficient of the j-th set of transmission direction weighting coefficients of the m-th diverse group of transmission channels, m=1,2, ..., M, j=1,2, ..., $L_m$, k=1,2, ... K $$h_{m,k} = \sum_{n=1}^{N} h_{m,k,n} \cdot \delta(t - \tau_n)$$

is an impulse response of the k-th transmission channel of the m-th diverse group of transmission channels, where $h_{m,k,n}$ is a coefficient of the estimated impulse response of the k-th transmission channel of the m-th diverse group of transmission channels corresponding to the n-th resolvable path of transmitted pilot signals, $\tau_n$ is a delay of the n-th resolvable path of transmitted pilot signals, m=1,2, ..., M, k=1,2, ..., K, n=1,2, ..., N.

The estimate of a transfer function of this channel of directional transmission is equal to Fourier transform of the formed impulse response $H_{m,j}$ of this channel of directional transmission.

The claimed invention does not rule out the possibility that the propagation channel transfer functions corresponding to effective transmission directions of each adaptive antenna array could be estimated in any other way. It is the operation of estimating these transfer functions that is important.

A feedback signal, containing M diverse groups of transmission channels $L_m$, formed sets of weighting coefficients of transmission direction, as well as the estimated transfer function for each of M diverse groups of transmission channels for each of $L_m$ sets of weighting coefficients of transmission direction, is transmitted from mobile to base station.

$L_m$ directional transmission channels are formed at the base station at each of M diverse groups of transmission channels using the transmitted sets of weighting coefficients of transmission direction.

At each of M adaptive antenna arrays each of $L_m$ directional transmission channels is formed by the corresponding directional transmission block 2-m-j, where j takes on the values from 1 to $L_m$, corresponding analog transmitters 4-m-1-4-m-K and the corresponding antenna elements 5-m-1-5-m-K.

The transmitted signal arrives at the first input of directional transmission block 2-m-j, and the set of weighting coefficients of transmission direction ($W_{m,j,1} \equiv 1$, $W_{m,j,2}$, ..., $W_{m,j,K}$) arrives at its second inputs.

In each of $L_m$ channels of directional transmission K copies of an input signal of this channel of directional transmission are formed and transmitted over the corresponding transmission channel of this diverse group of transmission channels once each copy, starting from the second one, has been multiplied by the corresponding weighting coefficient of transmission direction of the respective set of weighting coefficients of transmission direction.

K copies of the input signal of directional transmission channel 2-m-j arrive at the first inputs of multipliers 6-m-1-6-m-K, to the second inputs of which arrive the weighting coefficients of transmission direction ($W_{m,j,1} \equiv 1$, $W_{m,j,2}$, ..., $W_{m,j,K}$). In each of multipliers 6-m-1-6-m-K the corresponding k-th copy of the signal, where k takes on the values from 1 to K, is multiplied by the corresponding weighting coefficient of transmission direction $W_{m,j,k}$.

Channels of signal spectrum correction are generated at the base station for each of M diverse groups of transmission channels for each of $L_m$ directional transmission channels and their transfer functions are corrected according to the transmitted estimated transfer functions of directional transmission channels in such a way as to maximize the information signal reception quality at the mobile station.

A transfer function of each channel of signal spectrum correction is formed as a function complex conjugate of the corresponding estimated transfer function of the directional transmission channel.

In "Closed loop transmit diversity" method, described in RF patent # 2192094, published on Oct. 27, 2002, bulletin # 30, Int. Cl$^7$ H 04 B 7/005 it is shown that in this way all spectral components of the information signal copies, transmitted from each adaptive antenna array in every effective transmission direction, are added coherently. Accordingly, the information signal reception quality at the mobile station is maximized. Each block of signal spectrum correction 7-1-1-7-M-$L_M$ can be implemented as a filter, whose transfer function is equal to the function complex conjugate of the transfer function of the propagation channel, corresponding to this directional transmission channel.

The information signal copies are formed at the base station for all $L_m$ channels of directional transmission for all M diverse groups of transmission channels and all formed copies of information signal are simultaneously transmitted over the corresponding channels of directional transmission after applying them to the respective channels of signal spectrum correction.

The information signal copies are transmitted to the mobile station from each adaptive antenna array in each effective transmission direction once the spectrum of each information signal copy has been corrected in such a way as to provide coherent addition of all spectral components, which maximizes the information signal reception quality at the mobile station.

First $$\sum_{m=1}^{M} L_m$$

information signal copies are formed, which arrive at the first inputs of signal spectrum correction blocks 7-1-1-7-M-$L_M$ and then at the first inputs of directional transmission blocks 2-1-1-2-M-$L_M$.

The information signal copy (with already corrected spectrum) incoming to each directional transmission block 2-1-1-2-M-$L_M$ is used to generate another K copies, applied to the first inputs of the multipliers 6-m-1-6-m-K.

Then $$\left(\sum_{m=1}^{M} L_m\right) \cdot K$$

information signal copies with corrected spectrum and multiplied by the corresponding weighting coefficients of transmission direction are fed from the outputs of directional transmission blocks 2-1-2-M-$L_M$ to the second inputs of summation blocks 3-1-1-3-M-K, from their outputs they are fed to the inputs of analog transmitters 4-1-1-4-M-K, from the outputs of which they are applied to the inputs of antenna elements 5-1-1-5-M-K, and from their outputs they are passed to the mobile station over the radiolink.

The summation blocks 3-1-1-3-M-K enable simultaneous transmission of the information signal copies and the pilot signals over M·K transmission channels.

Figure 10:
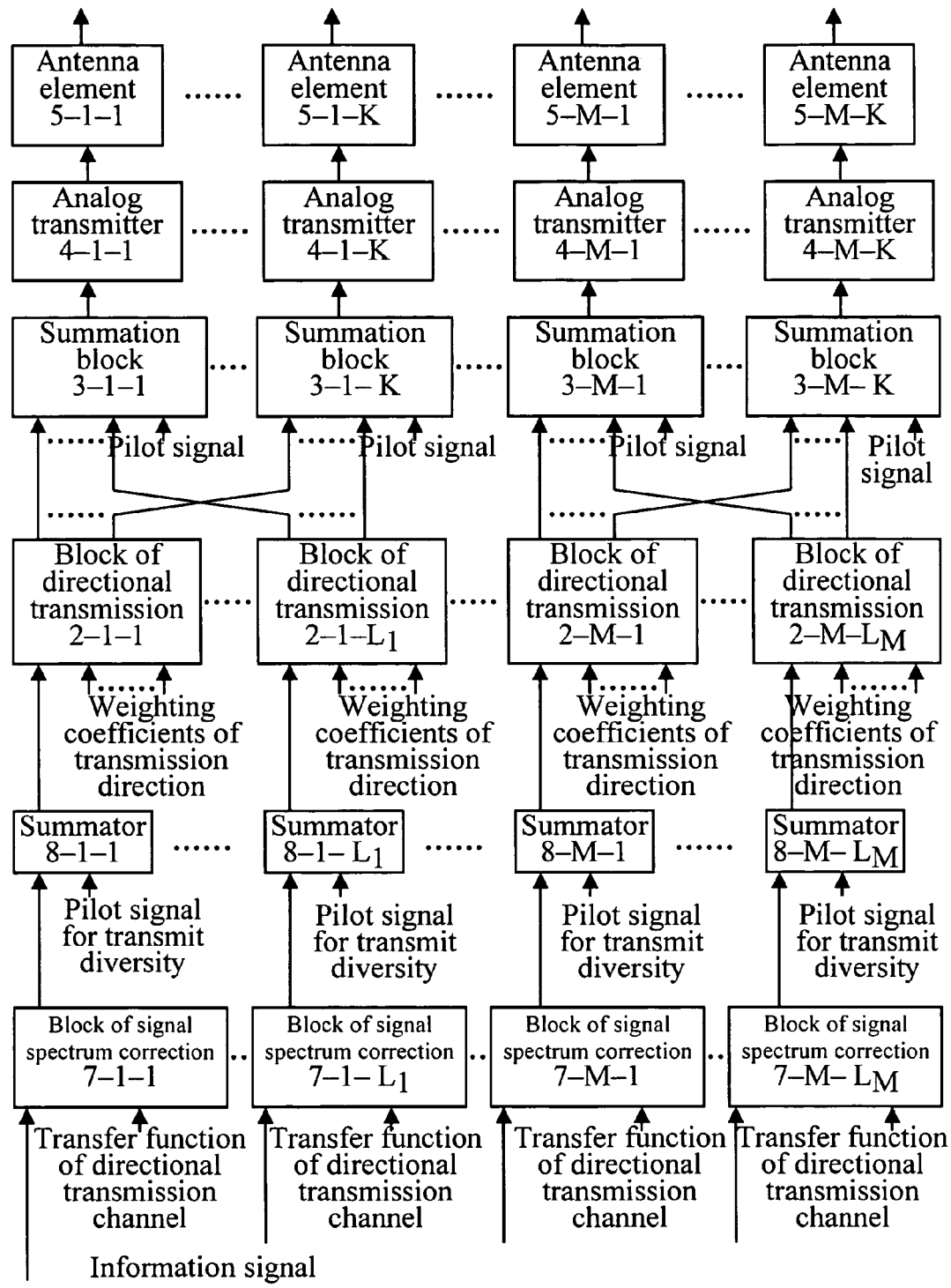
FIG. 10 shows a block-diagram of the claimed apparatus for data transmission according to the second embodiment.

The method of data transmission according to the second embodiment is implemented using the device, whose block-diagram is shown in FIG. 10. M diverse groups of transmission channels each having K transmission channels, where $M \geq 1$, $K \geq 1$, are formed at the base station.

Pilot signals are transmitted from the base station to the mobile station from all M·K transmission channels of diverse groups.

Impulse responses of M·K transmission channels of diverse groups are estimated at mobile station using transmitted pilot signals.

$L_m$ sets of weighting coefficients of transmission direction each having K-1 weighting coefficients of transmission direction are formed at mobile station using the estimated impulse responses of M·K transmission channels of diverse groups, where $1 \leq L_m \leq K$ and m=1,2, . . . , M.

This operation is performed in the same way as the one according to the first embodiment of data transmission method.

A feedback signal containing $L_m$ weighting coefficients of transmission direction formed for each of M diverse groups of transmission channels is transmitted from the mobile station to the base station.

$L_m$ channels of directional transmission are formed at the base station for each of M diverse groups of transmission channels using the transmitted sets of weighting coefficients of transmission direction.

This operation is done in the same way as the one according to the first embodiment of data transmission method.

Pilot signals for transmit diversity are transmitted from the base station to the mobile station from each of M diverse groups of transmission channels over each of $L_m$ channels of directional transmission.

Pilot signals for transmit diversity arrive at the corresponding second inputs of summators 8-1-1-8-M-$L_M$, from the outputs of which they are supplied to the first inputs of directional transmission blocks 2-1-1-2-M-$L_M$, from K outputs of each of them they go to the corresponding second inputs of summation blocks 3-1-1-3-M-K, from the outputs of which they go to the inputs of analog transmitters 4-1-1-4-M-K, from the outputs of which they are applied to the inputs of antenna elements 5-1-1-5-M-K, from the outputs of which they are fed to the mobile station over the radiolink.

Directional transmission blocks 2-1-1-2-M-$L_M$ enable transmission of the pilot signals for transmit diversity over the selected efficient transmission directions.

Transfer functions of all $L_m$ channels of directional transmission are estimated at the mobile station for each of M diverse groups of transmission channels using the transmitted pilot signals for transmit diversity. The estimate of a transfer function of each channel of directional transmission is equal to Fourier transform of the estimated impulse response of this channel of directional transmission.

A feedback signal containing $L_m$ estimated transfer functions of directional transmission channels for each of M diverse groups of transmission channels is transmitted from the mobile station to the base station.

The claimed invention does not rule out the possibility that the transfer functions of propagation channels, corresponding to the effective transmission directions for each adaptive antenna array could be estimated in any other way. It is the operation of estimating these transfer functions, which is important.

Channels of signal spectrum correction are formed at the base station for each of M diverse groups of transmission channels for each of $L_m$ channels of directional transmission and their transfer functions are corrected according to the transmitted estimated transfer functions of channels of directional transmission in such a way that the reception quality of the information signal at the mobile station is maximized.

This operation is done in the same way as the one according to the first embodiment of data transmission method.

The information signal copies are formed at the base station for all $L_m$ channels of directional transmission for all M diverse groups of transmission channels and all formed copies of the information signal are simultaneously transmitted over the corresponding channels of directional transmission after applying them to the respective channels of signal spectrum correction.

From the outputs of the corresponding blocks of signal spectrum correction 7-1-1-7-M-$L_M$, the information signal copies (with already corrected spectrum) arrive at the first inputs of summators 8-1-1-8-M-$L_M$, where they are summed with the corresponding pilot signals for transmit diversity, and are further supplied to the respective directional transmission blocks 2-1-1-2-M-$L_M$ and then to the mobile station over the radiolink according to the first embodiment of data transmission method.

Summators 8-1-1-8-M-$L_M$ enable simultaneous transmission of the information signal copies and the pilot signals for transmit diversity over the selected efficient transmission directions.

All transmitted pilot signals, pilot signals for directional transmission and the information signal are mutually orthogonal or quasi-orthogonal.

FIG. 10 is the block-diagram of the apparatus for data transmission according to the third embodiment.

M diverse groups of transmission channels each having K transmission channels are formed at the base station, where $M \geq 1$, $K \geq 1$.

Pilot signals are transmitted from the base station to the mobile station from all M·K transmission channels of diverse groups.

Impulse responses of M·K transmission channels of diverse groups are estimated at the mobile station using the transmitted pilot signals.

$L_m$ sets of weighting coefficients of transmission direction each having K−1 weighting coefficients of transmission direction are formed at the mobile station for each of M diverse groups of transmission channels using the estimated impulse responses of M·K transmission channels of diverse groups, where $1 \leq L_m \leq K$ and m=1,2, . . . , M.

This operation is done in the same way as the one according to the second embodiment of data transmission method.

Transfer functions of channels of directional transmission corresponding to each of $L_m$ sets of weighting coefficients of transmission direction of all M diverse groups of transmission channels are estimated at the mobile station. This operation is done in the same way as the one according to the second embodiment of data transmission method.

A feedback signal containing $L_m$ formed sets of weighting coefficients of transmission direction for each of M diverse groups of transmission channels is transmitted from the mobile station to the base station.

$L_m$ channels of directional transmission are formed at the base station at each of M diverse groups of transmission channels using the transmitted sets of weighting coefficients of transmission direction.

This operation is done in the same way as the one according to the second embodiment of data transmission method.

Pilot signals for transmit diversity are transmitted from the base station to the mobile station from each of M diverse groups of transmission channels over each of $L_m$ channels of directional transmission.

Transfer functions of each of $L_m$ channels of directional transmission are estimated at the mobile station for each of M diverse groups of transmission channels using the transmitted pilot signals for transmit diversity.

This operation is done in the same way as the one according to the second embodiment of data transmission method.

For each of M diverse groups of transmission channels an estimate of a transfer function of each of $L_m$ channels of directional transmission, obtained using K pilot signals transmitted from this diverse group of transmission channels, is combined with an estimate of its transfer function, obtained using pilot signal for transmit diversity transmitted from this diverse group of transmission channels.

These two transfer function estimates are averaged over the weights inversely proportional to the error performance of these estimates.

Such averaging provides the minimum combined estimate error in case of Gaussian nature of these estimates errors.

The claimed invention permits other ways of averaging the transfer functions of these two estimates. It is the operation of combining these two estimates to reduce the combination result error, which is important.

A feedback signal containing $L_m$ estimated transfer functions of channels of directional transmission for each of M diverse groups of transmission channels is transmitted from the mobile station to the base station.

Channels of signal spectrum correction are formed at the base station for each of M diverse groups of transmission channels for each of $L_m$ channels of directional transmission and their transfer functions are corrected according to the transmitted estimated transfer functions of channels of directional transmission in such a way that the reception quality of the information signal at the mobile station is maximized.

This operation is done in the same way as the one according to the second embodiment of data transmission method.

Information signal copies are formed at the base station for all $L_m$ channels of directional transmission for all M diverse groups of transmission channels and all these copies are simultaneously transmitted over the corresponding channels of directional transmission after applying them to the respective channels of signal spectrum correction.

This operation is done in the same way as the one according to the second embodiment of data transmission method.

Figure 11:
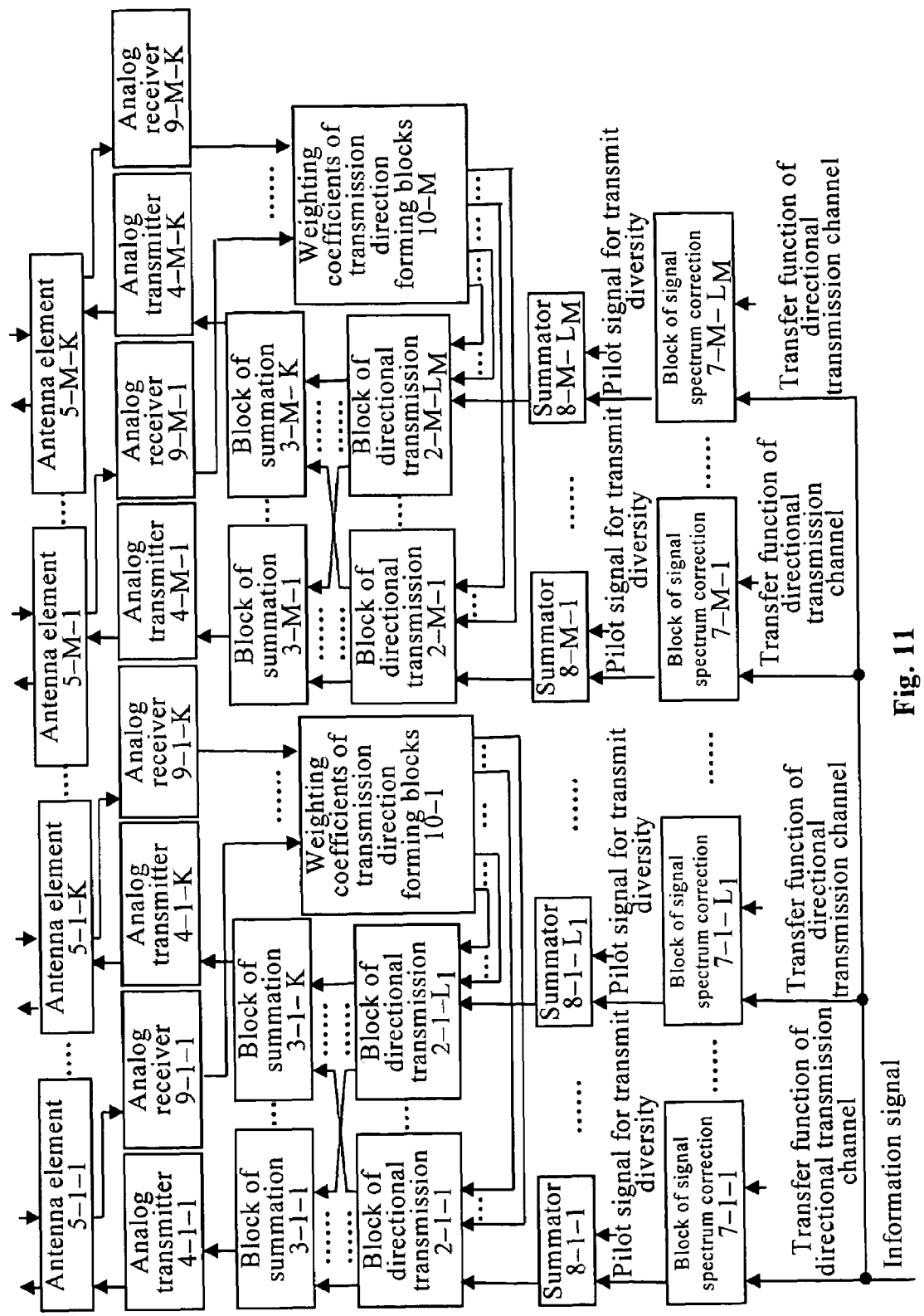
FIG. 11 is a block-diagram of the claimed apparatus for data transmission according to the third embodiment.

The method of data transmission according to the fourth embodiment is implemented in the apparatus, the block-diagram of which is depicted in FIG. 11.

M diverse groups of transmission channels each having K transmission channels are formed at the base station, where $M \geq 1$, $K \geq 1$.

This operation is done in the same way as the one according to the first embodiment of data transmission method.

M diverse groups of receiving channels each having K receiving channels, corresponding to M formed diverse groups of transmission channels are formed at the base station.

Each of M·K receiving channels is formed by the corresponding analog transmitter 9-m-k and the corresponding antenna element 5-m-k, where m takes on the values from 1 to M, and k takes on the values from 1 to K.

Each of M diverse groups of receiving channels is formed by the corresponding weighting coefficients of transmission direction forming block 10-m, the corresponding analog transmitters 9-m-1-9-m-K and the corresponding antenna elements 5-m-1-5-m-K.

Each diverse group of receiving channels is an adaptive antenna array. The total of M diversity adaptive antenna arrays are used for transmission.

The signal is transmitted from the mobile station and received at the base station over each of K receiving channels of each of M diverse groups.

The signal transmitted from mobile to base station is a pilot signal, or an information signal, or a feedback signal, or a control signal, or any combination of the above signals.

Let $u_{m,k,i}$ denote the i-th sample of the mobile station signal, received over the k-th receiving channel of the m-th diverse group, where i=1,2, . . . , I. Let $\vec{u}_{m,i} = [u_{m,1,i} \ldots u_{m,K,i}]^T$ denote the i-th sample of the vector of signals, received over K receiving channels of the m-th diverse group, where $\vec{x}^T$ is the transposition of vector $\vec{x}$.

$L_m$ sets of weighting coefficients of transmission direction each having K coefficients, where $L_m \geq 0$, and m=1,2, . . . , M, are formed for each of M diverse groups of transmission channels using the signal received from the mobile station.

To do this, the following sequence of actions is performed in the weighting coefficients of transmission direction forming blocks 10-1-10-M.

The [K×K] correlation matrix $\hat{R}1_m$ is estimated using I samples of signal vector $\vec{u}_{m,i}$ received over K receiving channels of the m-the diverse group as $$\hat{R}1_m = \frac{1}{I}\sum_{i=1}^{I}\vec{u}_{m,i}\vec{u}_{m,i}^{H},$$

where $\vec{x}^H$ is the Hilbert conjugation of vector $\vec{x}$.

The correlation matrix $\hat{R}1_m$ is decomposed into eigen values and eigen vectors $$\hat{R}1_m\hat{V}_m = \hat{V}_m\hat{\Lambda}_m,$$

where
$\hat{\Lambda}_m = \text{diag}\{\lambda_{m,1}, \lambda_{m,2}, \ldots, \lambda_{m,k}\}$ is the [K×K] diagonal matrix of correlation matrix $\hat{R}_m$ eigen values,
$\lambda_{m,1} \geq \lambda_{m,2} \geq \ldots \geq \lambda_{m,K}$ are the eigen values arranged in decreasing order, $\hat{V}_m = [\vec{q}_{m,1}\ \vec{q}_{m,2}\ \ldots\ \vec{q}_{m,K}]$ is the [K×K] matrix of the correlation matrix $\hat{R}1_m$ eigen vectors.

The number of $D_m$ directions of the received signal arrival at the m-th diverse group of receiving channels is estimated using the number of $C_m$ minimum eigen values of the correlation matrix $\hat{R}1_m$ $D_m = K - C_m$.

The decision function $P_m(\theta, \phi)$, the arguments of which are the angles of signal arrival $\theta$ and $\phi$, is obtained as $$\Omega_m(\theta, \varphi) = \frac{\vec{a}^H(\theta, \varphi)\vec{a}(\theta, \varphi)}{\vec{a}^H(\theta, \varphi)\hat{V}_{m,noise}\hat{V}_{m,noise}^H\vec{a}(\theta, \varphi)},$$

where
$\vec{a}(\theta, \phi)$ is the [1×K] weighting coefficients vector, corresponding to transmission direction $(\theta, \phi)$,
$\hat{V}_{m,noise}$ is the $[C_m \times K]$ matrix of minimum eigen vectors of the correlation matrix $\hat{R}1_m$, corresponding to C minimum eigen values of the correlation matrix $\hat{R}1_m$, equal to $$\hat{V}_{m,noise} = [\vec{q}_{D_m+1}\ \vec{q}_{D_m+2}\ \ldots\ \vec{q}_K].$$

The expression for the vector of weighting coefficients $\vec{a}(\theta, \phi)$ depends on the adaptive antenna array configurations. For example, for a linear equidistant antenna array, placed along the x axis with the zero antenna element placed in the point of origin, the vector of weighting coefficients $\vec{a}(\theta, \phi)$ is defined by the expressions $$\vec{a}(\theta, \phi) = [a_1(\theta, \phi), a_2(\theta, \phi), \ldots, a_K(\theta, \phi)]^T,$$

$a_k(\theta, \phi) = \exp(-j\beta(x_k \cos\phi \sin\theta + y_k \sin\phi \sin\theta + z_k \cos\theta))$ (J. C. Liberti and T. S. Rappaport, Smart antennas for wireless communications: IS-95 and third generation CDMA applications, Prentice Hall, New Jersey, 1999).

$D_m$ maxima of decision function $\Omega_m(\theta, \phi)$, corresponding to $D_m$ directions of arrival $\vec{a}_{m,1}(\theta_{m,1}, \phi_{m,1}), \ldots, \vec{a}_{m,D_m}(\theta_{m,D_m}, \phi_{m,D_m})$ of signal arriving at the m-th diverse group of the receiving channels are obtained.

Average receiving power values corresponding to these directions are derived as $$P_{m,d} = \vec{a}_{m,d}^H(\theta_{m,d}, \phi_{m,d})\hat{R}1_m \vec{a}_{m,d}(\theta_{m,d}, \phi_{m,d}),$$

where $d = 1, 2, \ldots, D_m$.

The above sequence of operations used to estimate each of M diverse groups of receiving channels of signal arrival directions and the corresponding average power values is given as an example described in (J. C. Liberti and T. S. Rappaport, Smart antennas for wireless communications: IS-95 and third generation CDMA applications, Prentice Hall, New Jersey, 1999).

The claimed invention permits other ways of estimating directions of the received signal arrival and the corresponding average receiving power values for each of M diverse groups of receiving channels.

$L_m$ directions corresponding to $L_m$ maximum average reveiving power values are selected for each of M diverse groups of receiving channels out of all directions estimated for this group. These values are selected as follows.

The maximum average reveiving power value is obtained as $$P_{m,\max} = \max_{d}\{P_{m,d}\}.$$

Such values of $P_{m,j}$ are selected from all average values of received signal power that $$P_{m,j} \geq \beta \cdot P_{m,\max},$$

where $0 \leq \beta \leq 1$, $j = 1, 2, \ldots, L_m$, and $L_m$ is equal to the number of average values of received signal power $P_{m,j}$, for which this condition is satisfied.

$L_m$ directions $\vec{a}_{m,j}(\theta_{m,j}, \phi_{m,j})$, corresponding to $L_m$ selected maximum average values of received signal power $P_{m,j}$ are selected.

$L_m$ sets of weighting coefficients of transmission direction each having K coefficients of transmission direction are formed for each of M diverse groups of transmission channels in $L_m$ directions of signal arrival selected for the corresponding diverse group of reception channels according to the expression $$W1_{m,j,k} = \frac{\sqrt{P_{m,j}} \cdot a_{m,j,k}(\theta_{m,j}, \varphi_{m,j})}{\sum_{m=1}^{M}\sum_{j=1}^{L_m}\sum_{k=1}^{K} P_{m,j} \cdot a_{m,j,k}(\theta_{m,j}, \varphi_{m,j})^2},$$

where $W1_{m,j,k}$ is the k-th weighting coefficient of transmission direction of the j-th set of the m-th diverse group of transmission channels.

That is, in each of the selected efficient transmission directions a part of the transmitted signal energy proportional to the average power value of the signal received from this direction is radiated; thereby the reception quality of the base station signal received at mobile station is maximized.

$L_m$ directional transmission channel are formed at the base station at each of M diverse groups of transmission channels using the formed sets of weighting coefficients of transmission direction.

At each of M adaptive antenna arrays each of $L_m$ directional transmission channels is formed by the corresponding blocks of directional transmission 2-m-j, where j takes on the values from 1 to $L_m$, corresponding analog transmitters 4-m-1-4-m-K and the corresponding antenna elements 5-m-1-5-m-K.

The transmitted signal is fed to the first input of directional transmission block 2-m-j, and the set of weighting coefficients of transmission direction ($W1_{m,j,1}$, $W1_{m,j,2}$, ..., $W1_{m,j,K}$) arrives at its second inputs.

In each channel of directional transmission K copies of an input signal of this channel of directional transmission are formed and transmitted over the corresponding transmission channel of this diverse group of transmission channels once each copy, starting from the second one, has been multiplied by the corresponding weighting coefficient of transmission direction of the corresponding set of weighting coefficients of transmission direction.

K copies of an input signal of directional transmission channel 2-m-j arrive at the first inputs of multipliers 6-m-1-6-m-K, to the second inputs of which the weighting coefficients of transmission direction ($W1_{m,j,1}$, $W1_{m,j,2}$, ..., $W1_{m,j,K}$) are fed. In each multiplier 6-m-1-6-m-K the corresponding k-th copy of the signal is multiplied by the corresponding weighting coefficients of transmission direction $W1_{m,j,k}$, where k takes on the values from 1 to K.

A pilot signal for transmit diversity is transmitted from the base station to the mobile station from each of M diverse groups of transmission channels over each of $L_m$ directional transmission channels.

This operation is done in the same way as the one according to the second embodiment of the data transmission method.

Transfer functions of all $L_m$ channels of directional transmission are estimated at the mobile station for each of M diverse groups of transmission channels using the transmitted pilot signals for transmit diversity.

This operation is done in the same way as the one according to the second embodiment of data transmission method.

A feedback signal containing $L_m$ estimated transfer functions of directional transmission channels for each of M diverse groups of transmission channels is transmitted to the base station.

Channels of signal spectrum correction are formed at the base station for each of M diverse groups of transmission channels for each of $L_m$ channels of directional transmission and their transfer functions are corrected according to the transmitted estimated transfer functions of directional transmission channels in such a way that the reception quality of the information signal at the mobile station is maximized.

This operation is done in the same way as the one according to the second embodiment of data transmission method.

All transmitted pilot signals for directional transmission and the information signal are mutually orthogonal or quasi-orthogonal.

The claimed group of inventions that is, the method of data transmission (embodiments) and the apparatus for data transmission (embodiments) have the following significant advantages over the inventions known to those skilled in the art.

First of all, the proposed invention provides coherent summation of the information signal copies at the receiver in a frequency-selective signal fading environment.

Secondly, it allows increasing the number of transmission channels and, hence, improving the efficiency of fading averaging.

Furthermore, the invention ensures the enhanced quality of estimating the transfer functions of directional transmission channel and, hence, increases the efficiency of coherent information signal copies summation at the receiver, which improves the reception quality at the mobile station.

Finally, the proposed method and apparatus for data transmission allow essintially reducing the uplink (from the mobile to the base station) load.

The above benefits increase the efficiency of the information signal transmission in the downlink and, hence, maximize the information signal reception quality at the mobile station as well as reduce the uplink load.

These results are achived by correcting the spectrum of the transmitted information signal copies, transmitting information signal copies from each adaptive antenna array in each effective transmission direction, estimating the transfer functions of directional transmission channels using the pilot signals transmitted from each antenna element, pilot signals for transmit diversity, transmitted from each adaptive antenna array in each efficient transmission direction, combining these two estimates and by estimating the efficient transmission directions at the base station using the mobile station signal.

INDUSTRIAL APPLICABILITY

A method of data transmission (embodiments) and an apparatus of data transmission (embodiments) may be used, for example, in cellular communications systems when transmitting the information signal over the downlink from the base station to the mobile station.

The invention claimed is:

1. A method of data transmission in a cellular communication system including a base station used for mobile station data transmission over a downlink, in which the mobile station transmits base station data over an uplink, comprising the following steps:
   (a) M diversity groups of transmission channels each having K transmission channels, where $M \geq 1$, $K \geq 1$, are formed at the base station,
   (b) a pilot signal is transmitted from the base station to the mobile station from each of M·K transmission channels of diversity groups,
   (c) impulse responses of M·K transmission channels of diversity groups are estimated at the mobile station using the transmitted pilot signals,
   (d) $L_m$ sets of weighting coefficients of transmission direction each having K−1 weighting coefficients of transmission direction, where $1 \leq L_m \leq K$ and m=1,2, ..., M are formed at the mobile station for each of M diversity groups of transmission channels,
   (e) for each of M diversity groups of transmission channels for each of $L_m$ sets of weighting coefficients of transmission direction, a transfer function of a channel of directional transmission corresponding to the set is estimated at the mobile station using the estimated impulse responses of M·K transmission channels of diversity groups,
   (f) a feedback signal containing $L_m$ weighting coefficients of transmission direction formed for each of M diversity groups of transmission channels and an estimated transfer function for each of $L_m$ weighting coefficients of transmission direction for each of M diversity groups of transmission channels are transmitted from the mobile station to the base station,
   (g) $L_m$ channels of directional transmission are formed at the base station for each of M diversity groups of transmission channels using the transmitted sets of weighting coefficients of transmission direction,
   (h) channels of signal spectrum correction are formed at the base station for each of M diversity groups of transmission channels for each of $L_m$ channels of directional transmission and their transfer functions are corrected according to the transmitted estimated transfer functions of channels of directional transmission in such a way that the reception quality of an information signal at the mobile station is maximized, and (i) information signal copies are formed at the base station for each of M diversity groups of transmission channels for each of $L_m$ channels of directional transmission and all formed copies of the information signal are simultaneously transmitted over the corresponding channels of directional transmission after applying them to the respective channels of signal spectrum correction.

2. The method of claim 1, wherein all transmitted pilot signals and the information signal are mutually orthogonal or quasi-orthogonal.

3. The method of claim 1, wherein $L_m$ sets of weighting coefficients of transmission direction each having K−1 weighting coefficients of transmission direction are formed at the mobile station for each of M diverse groups of transmission channels using the estimated impulse responses of M·K transmission channels of diverse groups in such a way that a spatial correlation matrix $\hat{R}_{m,n}$ is formed for each of M diverse groups of transmission channels for all of N resolvable paths of the transmitted pilot signals, where N≧1, as follows $$\hat{R}_{m,n} = \begin{bmatrix} h_{m,1,n} \\ h_{m,2,n} \\ \vdots \\ h_{m,K,n} \end{bmatrix} \cdot [(h_{m,1,n})^* \quad (h_{m,2,n})^* \quad \ldots \quad (h_{m,K,n})^*],$$

where $h_{m,k,n}$ is a coefficient of the estimated impulse response of transmission channel k of diverse group m corresponding to the resolvable path n of the transmitted pilot signals, m=1, 2, ..., M, k=1,2, ..., K, n=1,2, ..., N, and x* is an operation of complex conjugation of x, the spatial correlation matrix $\hat{R}_m$ of all resolvable paths is formed for each of M diverse groups of transmission channels as follows $$\hat{R}_m = \sum_{n=1}^{N} \hat{R}_{m,n},$$

wherein an averaged spatial correlation matrix $\hat{R}_m(i)$, where i≧1 is the number of an averaging step, is formed for each of M diverse groups of transmission channels as follows $$\hat{R}_m(i) = \begin{cases} \hat{R}_m, & i = 1; \\ \alpha \hat{R}_m(i-1) + (1-\alpha)\hat{R}_m, & i > 1; \end{cases}$$

where 0≦α≦1 is an averaging coefficient, the averaged spatial correlation matrix $\hat{R}_m(i)$ is decomposed into eigen values $\theta_{m,k}$ and corresponding eigen vectors $\vec{V}_{m,k}$, where k=1,2, ..., K, the maximum eigen value $\theta_{m,max}$ is selected among eigen values $\theta_{m,k}$, such eigen values $\theta_{m,j}$ are selected among all eigen values that $\theta_{m,j} \geq \beta \cdot \theta_{m,max}$, where 0≦β≦1, j=1,2, ..., $L_m$, $L_m$ is equal to the number of eigen values $\theta_{m,j}$ for which this condition is satisfied, $L_m$ eigen vectors $\vec{V}_{m,j}$ corresponding to $L_m$ selected eigen values $\theta_{m,j}$ are selected, and $L_m$ sets of weighting coefficients of transmission direction each having K−1 weighting coefficients of transmission direction are formed as follows $$W_{m,j,k} = \frac{V_{m,j,k}}{V_{m,j,1}},$$

where $W_{m,j,k}$ is the k-th transmission direction weighting coefficient of the J-th set of transmission direction weighting coefficients of the m-th diverse group of transmission channels, and $V_{m,j,k}$ is the k-th element of the j-th eigen vector of the averaged spatial correlation matrix of the m-th diverse group of transmission channels, m=1,2, ..., M, j=1,2, ..., $L_m$, k=2,3, ..., K.

4. The method of claim 1, wherein transfer functions of channels of directional transmission corresponding to each of $L_m$ sets of weighting coefficients of transmission direction of all M diverse groups of transmission channels are estimated at the mobile station in such a way that an impulse response of each channel of directional transmission is formed as follows $$H_{m,j} = \sum_{k=1}^{K} W_{m,j,k} \cdot h_{m,k}$$

$$W_{m,j,1} \equiv 1,$$

where $W_{m,j,k}$ is the k-th transmission direction weighting coefficient of the j-th set of transmission direction weighting coefficients of the m-th diverse group of transmission channels, $m = 1, 2, \ldots, M,$ $j = 1, 2, \ldots, L_m,$ $k = 1, 2, \ldots, K,$ $$h_{m,k} = \sum_{n=1}^{N} h_{m,k,n} \cdot \delta(t - \tau_n)$$

is an impulse response of the k-th transmission channel of the m-th diverse group of transmission channels, where $h_{m,k,n}$ is a coefficient of the estimated impulse response of the k-th transmission channel of the m-th diverse group of transmission channels corresponding to the n-th resolvable path of transmitted pilot signals, $\Gamma_n$ is a delay of the n-th resolvable path of transmitted pilot signals, m=1,2, ..., M, k=1,2, ..., K, n=1,2, ..., N, and an estimate of a transfer function of this channel of directional transmission is equal to the Fourier transform of the formed impulse response $H_{m,j}$ of the channel of directional transmission.

5. The method of claim 1, wherein channels of signal spectrum correction are formed at the base station for each of M diverse groups of transmission channels for each of $L_m$ channels of directional transmission in such a way that a transfer function of each channel of signal spectrum correction is equal to a complex conjugate of the corresponding estimated transfer function of the channel of directional transmission.

6. The method of claim 1, wherein all transmitted pilot signals and the information signal are quasi-orthogonal.

7. The method of claim 6, wherein all transmitted pilot signals, pilot signals for transmit diversity, and the information signal are mutually orthogonal.

8. The method of any of claim 6, wherein all transmitted pilot signals, pilot signals for transmit diversity, and the information signal are quasi-orthogonal.

9. The method of claim 6, wherein transfer functions of all $L_m$ channels of directional transmission are estimated at the mobile station for each of M diverse groups of transmission channels using the transmitted pilot signals for transmit diversity in such a way that an estimate of transfer function of each channel of directional transmission is equal to Fourier transform of estimated impulse response of this channel of directional transmission.

10. The method of claim 1, wherein $L_m$ channels of directional transmission are formed at the base station for each of M diverse groups of transmission channels using the transmitted sets of weighting coefficients of transmission direction in such a way that in each of $L_m$ channels of directional transmission K copies of an input signal of this channel of directional transmission are formed and transmitted over the corresponding transmission channel of the diverse group of transmission channels once each copy, starting from the second one, has been multiplied by the corresponding weighting coefficient of transmission direction of the respective set of weighting coefficients of transmission direction.

11. The method of claim 10, wherein a signal transmitted from the mobile station to the base station is a pilot signal, or an information signal, or a feedback signal, or a control signal, or any combination of these signals.

12. The method of claim 10, wherein $L_m$ sets of weighting coefficients of transmission direction each having K coefficients are formed for each of M diverse groups of transmission channels in such a way that directions of arrival and the corresponding receiving powers of the received signal are estimated for each of M diverse groups of receiving channels, $L_m$ directions corresponding to $L_m$ maximum average values of received signal power are selected for each of M diverse groups of receiving channels, $L_m$ sets of weighting coefficients of transmission direction each having K coefficients of transmission direction are formed for each of M diverse groups of transmission channels in $L_m$ directions of signal arrival selected for a corresponding diverse group of reception channels in such a way that the reception quality of the signal transmitted from the base station to the mobile station is maximized.

13. The method of claim 10, wherein channels of directional transmission are formed in such a way that in each channel of directional transmission, K copies of an input signal of the channel of directional transmission are formed and transmitted over a corresponding transmission channel once each copy of the input signal has been multiplied by the corresponding weighting coefficient of transmission direction of the respective set of weighting coefficients of transmission direction.

14. The method of claim 10, wherein all transmitted pilot signals for directional transmission and the information signal are mutually orthogonal or quasi-orthogonal.

15. A method of data transmission, comprising the following steps:

M diverse groups of transmission channels each having K transmission channels are formed at the base station, where $M \geq 1$, $K \geq 1$, pilot signals are transmitted from the base station to the mobile station from all M·K transmission channels of diverse groups, impulse responses of M·K transmission channels of diverse groups are estimated at the mobile station using the transmitted pilot signals, $L_m$ sets of weighting coefficients of transmission direction each having K−1 weighting coefficients of transmission direction are formed at the mobile station for each of M diverse groups of transmission channels using the estimated impulse responses of M·K transmission channels of diverse groups, where $1 \leq L_m \leq K$ and m =1,2, . . . , M, a feedback signal containing $L_m$ formed sets of weighting coefficients of transmission direction for each of M diverse groups of transmission channels is transmitted from the mobile station to the base station, $L_m$ channels of directional transmission are formed at the base station at each of M diverse groups of transmission channels using transmitted sets of weighting coefficients of transmission direction, pilot signals for transmit diversity are transmitted from the base station to the mobile station from each of M diverse groups of transmission channels over each of $L_m$ channels of directional transmission, transfer functions of each of $L_m$ channels of directional transmission are estimated at the mobile station for each of M diverse groups of transmission channels using the transmitted pilot signals for transmit diversity, a feedback signal containing $L_m$ estimated transfer functions of channels of direction transmission for each of M diverse groups of transmission channels is transmitted from the mobile station to the base station, channels of signal spectrum correction are formed at the base station for each of M diverse groups of transmission channels for each of $L_m$ channels of directional transmission and their transfer functions are corrected according to transmitted estimated transfer functions of channels of directional transmission in such a way that the reception quality of the information signal at the mobile station is maximized, and information signal copies are formed at the base station for all $L_m$ channels of directional transmission for all M diverse groups of transmission channels and all formed copies of the information signal are simultaneously transmitted over the corresponding channels of directional transmission after applying them to the respective channels of signal spectrum correction.

16. The method of claim 15, wherein for each of M diverse groups of transmission channels an estimate of a transfer function of each of $L_m$ channels of directional transmission, obtained using K pilot signals transmitted from the diverse group of transmission channels, is combined with an estimate of its transfer function, obtained using a pilot signal for transmit diversity transmitted from the diverse group of transmission channels, in such a way that the two estimates are averaged with weights that are inversely proportional to error metrics of the estimates.

17. A method of data transmission, comprising the steps of:

M diverse groups of transmission channels each having K transmission channels are formed at the base station, where $M \geq 1$, $K \geq 1$, pilot signals are transmitted from the base station to the mobile station from all M·K transmission channels of diverse groups, impulse responses of M·K transmission channels of diverse groups are estimated at the mobile station using the transmitted pilot signals, $L_m$ sets of weighting coefficients of transmission direction each having K−1 weighting coefficients of transmission direction are formed at the mobile station for each of M diverse groups of transmission channels using the estimated impulse responses of M·K transmission channels of diverse groups, where $1 \leq L_m \leq K$ and m=1,2, . . . , M, transfer functions of channels of directional transmission corresponding to each of $L_m$ sets of weighting coefficients of transmission direction of all M diverse groups of transmission channels are estimated at the mobile station, a feedback signal containing $L_m$ formed sets of weighting coefficients of transmission direction for each of M diverse groups of transmission channels is transmitted from the mobile station to the base station, $L_m$ channels of directional transmission are formed at the base station at each of M diverse groups of transmission channels using the transmitted sets of weighting coefficients of transmission direction, pilot signals for transmit diversity are transmitted from the base station to the mobile station from each of M diverse groups of transmission channels over each of $L_m$ channels of directional transmission, transfer functions of $L_m$ channels of directional transmission for each of M diverse groups of transmission channels are estimated at the mobile station using the transmitted pilot signals for transmit diversity, for each of M diverse groups of transmission channels an estimate of transfer function of each of $L_m$ channels of directional transmission, obtained using K pilot signals transmitted from the diverse group of transmission channels, is combined with an estimate of its transfer function, obtained using a pilot signal for transmit diversity transmitted from the diverse group of transmission channels, a feedback signal containing $L_m$ estimated transfer functions of channels of directional transmission for each of M diverse groups of transmission channels is transmitted from the mobile station to the base station, channels of signal spectrum correction are formed at the base station for each of M diverse groups of transmission channels for each of $L_m$ channels of directional transmission and their transfer functions are corrected according to the transmitted estimated transfer functions of channels of directional transmission in such a way that the reception quality of the information signal at the mobile station is maximized, and information signal copies are formed at the base station for all $L_m$ channels of directional transmission for all M diverse groups of transmission channels and all formed information signal copies are simultaneously transmitted over the corresponding channels of directional transmission after applying them to the respective channels of signal spectrum correction.

18. A method of data transmission, comprising the following steps:

M diverse groups of transmission channels each having K transmission channels are formed at the base station, where $M \geq 1$, $K \geq 1$, M diverse groups of receiving channels each having K receiving channels corresponding to M formed diverse groups of transmission channels are formed at the base station, a signal is transmitted from the mobile station to the base station and received at the base station in each of K receiving channels of each of M diverse groups, $L_m$ sets of weighting coefficients of transmission direction each having K coefficients are formed for each of M diverse groups of transmission channels using a signal received from the mobile station in such a way that the reception quality of the base station signal received at the mobile station is maximized, where $L_m \geq 0$ and m=1, 2, ..., M, $L_m$ channels of directional transmission are formed at each of M diverse groups of transmission channels using formed sets of weighting coefficients of transmission direction, pilot signals for transmit diversity are transmitted to the mobile station from each of M diverse groups of transmission channels over each of $L_m$ channels of directional transmission, transfer functions of all $L_m$ channels of directional transmission are estimated at the mobile station for each of M diverse groups of transmission channels using the transmitted pilot signals for transmit diversity, a feedback signal containing $L_m$ estimated transfer functions of directional transmission channels for each of M diverse groups of transmission channels is transmitted to the base station, channels of signal spectrum correction are formed at the base station for each of M diverse groups of transmission channels for each of $L_m$ channels of directional transmission and their transfer functions are corrected according to the transmitted estimated transfer functions of directional transmission channels in such a way that the reception quality of the information signal at the mobile station is maximized, and information signal copies are formed for all $L_m$ channels of directional transmission for all M diverse groups of transmission channels and all formed copies of the information signal are simultaneously transmitted over the corresponding channels of directional transmission after applying them to the respective channels of signal spectrum correction.

19. An apparatus for data transmission that includes

M blocks of directional transmission,

M·K summation blocks,

M·K analog transmitters, and

M·K antenna elements, wherein the second inputs of each of M blocks of directional transmission are inputs of corresponding weighting coefficients of transmission direction, each of K outputs of each of M blocks of directional transmission is connected to the second input of the corresponding block of summation, the first input of each of M·K blocks of summation is an input of the corresponding pilot signal, outputs of blocks of summation are connected to inputs of corresponding analog transmitters, outputs of the corresponding analog transmitters are connected to inputs of corresponding antenna elements, outputs of the corresponding antenna outputs are outputs of the apparatus for data transmission, and wherein another $$\sum_{m=1}^{M}(L_m - 1)$$

blocks of directional transmission and $$\sum_{m=1}^{M} L_m$$

blocks of signal spectrum correction are added, where the first input of each of $$\sum_{m=1}^{M} L_m$$

blocks of signal spectrum correction is an input of the information signal, the second input of each of $$\sum_{m=1}^{M} L_m$$

blocks of signal spectrum correction is an input of the corresponding transfer function of the channel of directional transmission, an output of each of $$\sum_{m=1}^{M} L_m$$

blocks of signal spectrum correction is connected to the first input of the corresponding block of directional transmission, and each of K outputs of each of $$\sum_{m=1}^{M} (L_m - 1)$$

additional blocks of directional transmission is connected to $(L_m-1)$ additional second inputs of the corresponding block of summation, where m takes on the values from 1 to M.

20. The apparatus of claim 19, wherein the block of directional transmission consists of K multipliers, where combined first inputs of K multipliers are the first input of block of directional transmission, their second inputs are the second inputs of block of directional transmission, and their outputs are outputs of the block of directional transmission.

21. An apparatus for data transmission that includes
M blocks of directional transmission,
M·K blocks of summation,
M·K analog transmitters, and
M·K antenna elements,
wherein
the second inputs of each of M blocks of directional transmission are inputs of the corresponding weighting coefficients of transmission direction,
each of K outputs of each of M blocks of directional transmission is connected to the second input of the corresponding block of summation,
the first input of each of M·K blocks of summation is an input of the corresponding pilot signal,
outputs of blocks of summation are connected to inputs of corresponding analog transmitters,
outputs of the corresponding analog transmitters are connected to inputs of corresponding antenna elements,
outputs of the corresponding antenna elements are outputs of the apparatus for data transmission,
wherein $$\sum_{m=1}^{M} (L_m - 1)$$

additional blocks of directional transmission, $$\sum_{m=1}^{M} L_m$$

blocks of signal spectrum correction, and $$\sum_{m=1}^{M} L_m$$

summators are added, where the first input of each of $$\sum_{m=1}^{M} L_m$$

blocks of signal spectrum correction is an input of the information signal, the second input of each of $$\sum_{m=1}^{M} L_m$$

blocks of signal spectrum correction is an input of the corresponding transfer function of the channel of directional transmission, an output of each of $$\sum_{m=1}^{M} L_m$$

blocks of signal spectrum correction is connected to the first input of the corresponding summator, the second input of each of $$\sum_{m=1}^{M} L_m$$

summators is an input of the corresponding pilot signal for transmit diversity, an output of each of $$\sum_{m=1}^{M} L_m$$

summators is connected to the first input of the corresponding block of directional transmission, and each of K outputs of each of $$\sum_{m=1}^{M}(L_m-1)$$

additional blocks of directional transmission is connected to $(L_{m-1})$ additional second inputs of the corresponding block of summation, where m takes on the values from 1 to M.

22. An apparatus for data transmission that includes

M blocks of directional transmission,

M·K blocks of summation,

M·K analog transmitters, and

M·K antenna elements, wherein outputs of each of M blocks of directional transmission are connected to inputs of the corresponding blocks of summation, an output of each of M·K blocks of summation is connected to an input of a corresponding analog transmitter, and an output of each of M·K analog transmitters is connected to a first input of a corresponding antenna element, a first output of each of M·K antenna elements is an output of the apparatus for data transmission, and wherein $$\sum_{m=1}^{M}(L_m-1)$$

additional blocks of directional transmission, $$\sum_{m=1}^{M}L_m$$

blocks of signal spectrum correction, $$\sum_{m=1}^{M}L_m$$

summators, M·K analog receivers, and M weighting coefficients of transmission direction forming blocks are added, where the first input of each of $$\sum_{m=1}^{M}L_m$$

blocks of signal spectrum correction is an input of the information signal, the second input of each $$\sum_{m=1}^{M}L_m$$

blocks of signal spectrum correction is an input of the corresponding transfer function of channel of directional transmission, an output of each of $$\sum_{m=1}^{M}L_m$$

blocks of signal spectrum correction is connected to the first input of the corresponding summator, the second input of each of $$\sum_{m=1}^{M}L_m$$

summators is an input of the corresponding pilot signal for transmit diversity, an output of each of $$\sum_{m=1}^{M}L_m$$

summators is connected to the first input of the corresponding block of directional transmission, K second inputs of each of $$\sum_{m=1}^{M}L_m$$

blocks of directional transmission are connected to K corresponding outputs of the respective weighting coefficients of transmission direction forming block, outputs of each of $$\sum_{m=1}^{M}(L_m-1)$$

additional blocks of directional transmission are connected to additional inputs of the corresponding blocks of summation, the second input of each of M·K antenna elements in an input of the receiving signal, the second output of each of M·K antenna elements is connected to an input of the corresponding analog receiver, and an output of each of M·K analog receivers is connected to the corresponding input of the respective weighting coefficients of transmission direction forming blocks.

23. A method of data transmission in a cellular communication system including a base station used for mobile station data transmission over a downlink, in which the mobile station transmits base station data over an uplink, comprising the following steps:

(a) M diversity groups of transmission channels each having K transmission channels are formed at the base station, where $M \geq 1$, $K \geq 1$, (b) a pilot signal is transmitted from the base station to the mobile station from each of M·K transmission channels of diversity groups, (c) impulse responses of M·K transmission channels of diversity groups are estimated at the mobile station using the transmitted pilot signals, (d) $L_m$ sets of weighting coefficients of transmission direction each having K−1 weighting coefficients of transmission direction are formed at the mobile station, (e) M·K transmission channels of diversity groups are formed at the mobile station for each of M diversity groups of transmission channels using the estimated impulse responses of M·K transmission channels of diversity groups in such a way that a spatial correlation matrix Rm, n is formed for each of M diversity groups of transmission channels for all of N resolvable paths of the transmitted pilot signals, where N≧1, as follows $R\hat{\ }m, n=[h\ m, 1, n\ h\ m, 2, n\ h\ m, K, n][(h\ m, 1, n)*(h\ m, 2, n)\ *(h\ m, K, n)*]$ where h.sub.m,k, n are coefficients of the estimated impulse response of transmission channel k of diversity group m corresponding to the resolvable path n of the transmitted pilot signals, and m=1,2, ... M, k=1,2, ... K, n=1,2, ... N, xI is an operation of complex conjugation of x, (f) the spatial correlation matrix Rm of all resolvable paths is formed for each of M diversity groups of transmission channels as follows:
  the matrix R sub m(i)+the matrix R sub m for i=1;
  alpha x the matrix R sub m(i-1)+(1-alpha)×Rsub m for i>1;
  where 0≦alpha ≦1 is an averaging coefficient, (g) the averaged spatial correlation matrix Rsub m(i) is decomposed into eigen values Thetasub m, k and corresponding eigen vectors Vsub m, k, where k=1,2, ... K, the maximum eigen value Thetasub m/max is selected among eigen values Thetasub m, κ, eigen values Thetasub m, j are selected among all eigen values, Thetasub m,j>=(Beta×Thetasub m/max), where 0<=Beta<=1, j=1,2, ... Lsub m, and Lsub m is equal to the number of eigen values Thetasub m, j, for which this condition is satisfied, (h) Lsub m eigen vectors Vsub m, j, corresponding to Lsub m selected eigen values Thetasub m, j, are selected, Lm sets of weighting coefficients of transmission direction each having K-1 weighting coefficients of transmission direction are formed as follows:
Wsub m,j,k=((Vsub m,j, k)/(Vsub m,j, 1)),
where Wsub m,j, k is the k-th transmission direction weighting coefficient of the j-th set of transmission direction weighting coefficients of the m-th diversity group of transmission channels, Vsub m,j, k is the k-th element of the j-th eigen vector of the averaged spatial correlation matrix of the m-th diversity group of transmission channels m=1,2, ... , M,j=1,2, ... Lsub m, k=2,3, ... K;

(i) a feedback signal containing $L_m$ sets of weighting coefficients of transmission direction formed for each of $M$ diversity groups of transmission channels and an estimated transfer function for each of $L_m$ sets of weighting coefficients of transmission direction for each of $M$ diversity groups of transmission channels is transmitted from the mobile station to the base station, (j) $L_m$ channels of directional transmission are formed at the base station for each of M diversity groups of transmission channels using the transmitted sets of weighting coefficients of transmission direction, (k) channels of signal spectrum correction are formed at the base station for each of M diversity groups of transmission channels for each of $L_m$ channels of directional transmission and their transfer functions are corrected according to the transmitted estimated transfer functions of channels of directional transmission in such a way that the reception quality of an information signal at the mobile station is maximized, (m) information signal copies are formed for all $L_m$ channels of directional transmission for all M diversity groups of transmission channels and all formed copies of the information signal are simultaneously transmitted over the corresponding channels of directional transmission after applying them to the respective channels of signal spectrum correction.

24. The method of claim 23, wherein transfer functions of channels of directional transmission corresponding to each of Lm sets of weighting coefficients of transmission direction of all M diversity groups of transmission channels are estimated at the mobile station in such a way that an impulse response of each channel of directional transmission is formed as follows:
  Hsub m, j=summation of from 1 to K of (Wsub m,j,k x hsub m,k), W m,j, 1, ident 1, where Wsub m, j, k, where $W_{m,j,k}$ is the k-th transmission direction weighting coefficient of the j-th set of transmission direction weighting coefficients of the m-th diversity group of transmission channels, m=1,2, ... , M, j=1,2, ... , $L_m$, k=1,2, ... , K, hsub m,k= summation of from 1 to N of (hsub m, k, n x $\partial(1-1$sub n) is an impulse response of the k-th transmission channel of the m-th diversity group of transmission channels, where $h_{m,k,n}$ is a coefficient of the estimated impulse response of the k-th transmission channel of the m-th diversity group of transmission channels corresponding to the n-th resolvable path of transmitted pilot signals, $\tau_n$ is a delay of the n-th resolvable path of transmitted pilot signals, m=1,2, ... , M, k=1,2, ... , K, n=1,2, ... , N, an estimate of a transfer function of this channel of directional transmission is equal to the Fourier transform of the formed impulse response $H_{m,j}$ of this channel of directional transmission.

25. A method of data transmission in a cellular communication system including a base station used for mobile station data transmission over a downlink, in which the mobile station transmits base station data over an uplink, comprising the following steps:

(a) M diversity groups of transmission channels each having K transmission channels, where M≧1,K≧1, are formed at the base station, (b) a pilot signal is transmitted from the base station to the mobile station from each of M·K transmission channels of diversity groups, (c) impulse responses of M·K transmission channels of diversity groups are estimated at the mobile station using the transmitted pilot signals, (d) $L_m$ sets of weighting coefficients of transmission direction each having K-1 weighting coefficients of transmission direction, where 1≦$L_m$≦K and m =1,2, ... , M are formed at the mobile station for each of M diversity groups of transmission channels, (e) for each of M diversity groups of transmission channels for each of $L_m$ sets of weighting coefficients of transmission direction, a transfer function of a channel of directional transmission corresponding to the set is estimated at the mobile station using the estimated impulse responses of M·K transmission channels of diversity groups, (f) a feedback signal containing $L_m$ weighting coefficients of transmission direction formed for each of M diversity groups of transmission channels and an estimated transfer function for each of $L_m$ weighting coefficients of transmission direction for each of M diversity groups of transmission channels are transmitted from the mobile station to the base station, (g) $L_m$ channels of directional transmission are formed at the base station for each of M diversity groups of transmission channels using the transmitted sets of weighting coefficients of transmission direction, (h) channels of signal spectrum correction are formed at the base station for each of M diversity groups of transmission channels for each of $L_m$ channels of directional transmission and their transfer functions are corrected according to the transmitted estimated transfer functions of channels of directional transmission in such a way that the reception quality of an information signal at the mobile station is maximized, and (i) information signal copies are formed at the base station for each of M diversity groups of transmission channels for each of $L_m$ channels of directional transmission and all formed copies of the information signal are simultaneously transmitted over the corresponding channels of directional transmission after applying them to the respective channels of signal spectrum correction, wherein transfer functions of channels of directional transmission corresponding to each of $L_m$ sets of weighting coefficients of transmission direction of all M diverse groups of transmission channels are estimated at the mobile station in such a way that an impulse response of each channel of directional transmission is formed as follows $$H_{m,j} = \sum_{k=1}^{K} W_{m,j,k} \cdot h_{m,k}$$

-continued $$W_{m,j,1} \equiv 1,$$

where $W_{m,j,k}$ is the k-th transmission direction weighting coefficient of the j-th set of transmission direction weighting coefficients of the m-th diverse group of transmission channels, $$m = 1, 2, \ldots, M,$$

$$j = 1, 2, \ldots, L_m,$$

$$k = 1, 2, \ldots, K,$$

$$h_{m,k} = \sum_{n=1}^{N} h_{m,k,n} \cdot \delta(t - \tau_n)$$

is an impulse response of the k-th transmission channel of the m-th diverse group of transmission channels, where $h_{m,k,n}$ is a coefficient of the estimated impulse response of the k-th transmission channel of the m-th diverse group of transmission channels corresponding to the n-th resolvable path of transmitted pilot signals, $\tau_n$ is a delay of the n-th resolvable path of transmitted pilot signals, m=1,2, ..., M, k=1,2, ..., K, n=1,2, ..., N, and an estimate of a transfer function of this channel of directional transmission is equal to the Fourier transform of the formed impulse response $H_{m,j}$ of the channel of directional transmission.

* * * * *